United States Patent
Galpin et al.

(10) Patent No.: US 11,323,716 B2
(45) Date of Patent: May 3, 2022

(54) METHOD AND APPARATUS FOR VIDEO ENCODING AND DECODING BASED ON NEURAL NETWORK IMPLEMENTATION OF CABAC

(71) Applicant: InterDigital VC Holdings, Inc., Wilmington, DE (US)

(72) Inventors: Franck Galpin, Cesson-Sevigne (FR); Fabien Racape, Los Altos, CA (US); Karam Naser, Cesson-Sevigne (FR); Philippe Bordes, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/050,730

(22) PCT Filed: Apr. 24, 2019

(86) PCT No.: PCT/US2019/028859
§ 371 (c)(1),
(2) Date: Oct. 26, 2020

(87) PCT Pub. No.: WO2019/209913
PCT Pub. Date: Oct. 31, 2019

(65) Prior Publication Data
US 2021/0120247 A1    Apr. 22, 2021

(30) Foreign Application Priority Data

Apr. 27, 2018   (EP) ...................................... 18305537

(51) Int. Cl.
*H04N 19/13*    (2014.01)
*H04N 19/105*   (2014.01)
(Continued)

(52) U.S. Cl.
CPC ............... *H04N 19/13* (2014.11); *G06N 3/02* (2013.01); *H04N 19/105* (2014.11);
(Continued)

(58) Field of Classification Search
None
See application file for complete search history.

(56) References Cited

U.S. PATENT DOCUMENTS 9,264,706 B2    2/2016  Karczewicz et al.
9,941,900 B1    4/2018  Horn et al.
(Continued)

FOREIGN PATENT DOCUMENTS

CN    1405735 A   *   3/2003
RU    2643655 C2      2/2018
(Continued)

OTHER PUBLICATIONS

Song et al, "Neural Network-Based Arithmetic Coding of Intra Prediction Modes in HEVC", CAS Key Laboratory of Technology in Geo-Spatial Information Processing and Application System, University of Science and Technology of China, Hefei 230027, China, VCIP 2017, Dec. 10-13, 2017.*
(Continued)

*Primary Examiner* — Chikaodili E Anyikire
(74) *Attorney, Agent, or Firm* — Condo Roccia Koptiw LLP

(57) ABSTRACT

Methods and apparatuses for video coding and decoding are provided. The method of video encoding includes accessing a bin of a syntax element associated with a block in a picture of a video, determining a context for the bin of the syntax element associated with the syntax element and entropy encoding the bin of the syntax element based on the determined context wherein either the bin of the syntax element is based on the relevance of a prediction by a neural network
(Continued)

of the syntax element or the probability associated to the context is determined by a neural network. A bitstream formatted to include encoded data, a computer-readable storage medium and a computer-readable program product are also described.

13 Claims, 14 Drawing Sheets

(51) Int. Cl.
H04N 19/132 (2014.01)
H04N 19/176 (2014.01)
H04N 19/46 (2014.01)
H04N 19/70 (2014.01)
G06N 3/02 (2006.01)

(52) U.S. Cl.
CPC ......... *H04N 19/132* (2014.11); *H04N 19/176* (2014.11); *H04N 19/46* (2014.11); *H04N 19/70* (2014.11)

(56) References Cited

U.S. PATENT DOCUMENTS

| | | | | |
|---|---|---|---|---|
| 10,652,581 | B1* | 5/2020 | Bokov | H04N 19/18 |
| 10,681,380 | B2 | 6/2020 | Terada et al. | |
| 2007/0233477 | A1 | 10/2007 | Halowani et al. | |
| 2009/0110070 | A1 | 4/2009 | Takahashi et al. | |
| 2013/0027230 | A1* | 1/2013 | Marpe | H04N 19/436 |
| | | | | 341/107 |
| 2019/0246102 | A1* | 8/2019 | Cho | H04N 19/184 |
| 2020/0394514 | A1* | 12/2020 | Cho | G06N 3/04 |
| 2021/0014531 | A1* | 1/2021 | Pfaff | H04N 19/46 |
| 2021/0120247 | A1* | 4/2021 | Galpin | G06N 3/02 |

FOREIGN PATENT DOCUMENTS

| | | |
|---|---|---|
| WO | 2014/120656 A1 | 8/2014 |
| WO | 2016/199330 A1 | 12/2016 |

OTHER PUBLICATIONS

Albrecht et al., "Description of SDR, HDR, and 360 Video Coding Technology Proposal by Fraunhofer HHI", Joint Video Expert Team (JVET) of ITU-T SG 16 WP 3 and ISO/IEC JTC 1/SC 29/WG 11, Document: JVET-J0014-v4, 10th Meeting: San Diego, California, USA, Apr. 10, 2018, 122 pages.

Van Der Auwera et al., "Description of Core Experiment 3: Intra Prediction and Mode Coding", Joint Video Expert Team (JVET) of ITU-T SG 16 WP 3 and ISO/IEC JTC 1/SC 29/WG 11, Document: JVET-J1023, 10th Meeting: San Diego, California, USA, Apr. 10. 2018, 44 pages.

Chen et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, Document: JVET-F1001 v3, 6th Meeting, Hobart, Australia, Mar. 31, 2017, 48 pages.

Song et al., "Neural Network-Based Arithmetic Coding of Intra Prediction Modes in HEVC", 2017 IEEE Visual Communications and Image Processing (VCIP), St. Petersburg, FL, United Slates, Dec. 10, 2017, 4 pages.

Anonymous, "Reference software for ITU-T H.265 high efficiency video coding", International Telecommunication Union, ITU-T Telecommunication Standardization Sector of ITU, Series H: Audio-visual and Multimedia Systems, Infrastructure of audiovisual services—Coding of moving video, Recommendation ITU-T H.265.2, Oct. 2014, pp. 1-12.

Pfaff et al., Intra Prediction Modes based on Neural Networks, Joint Video Exploration Team (JVET) of ITU-T SG 16 WP 3 and ISO/IEC JTC 1/SC 29/WG 11, Document: JVET-J0037-v1, 10th Meeting, San Diego, California, USA, Apr. 10. 2018, 14 pages.

Marpe et al., "Context-Based Adaptive Binary Arithmetic Coding in the H.264/AVC Video Compression Standard", IEEE Transactions on Circuits and Systems for Video Technology, vol. X, No. Y, May 21, 2003, 18 pages.

Van Der Auwera et al., "Description of core experiment 3: Intra prediction and mode coding", JVET of ITU-T SG 16 WP 3 and ISO/IEC JTC 1/SC 29/WG 11, 10th Meeting: San Diego. California, USA, Apr. 10, 2018, Document JVET-J1023_r2, 49 pages.

JVET-G1001-V1, "Algorithm Description of Joint Exploration Test Model 7 (JEM 7)", Joint Video Exploration Team (JVET) of Itu-T Sg 16 WP3 and ISO/IEC JTC 1/SC 29/WG 11, 7th Meeting: Torino, IT, Jul. 13-21, 2017, 50 pages.

* cited by examiner $e_k = |MVD_A| + |MVD_B|$

METHOD AND APPARATUS FOR VIDEO ENCODING AND DECODING BASED ON NEURAL NETWORK IMPLEMENTATION OF CABAC

This application is the national stage entry, under 35 U.S.C. § 371 of International Application PCT/US2019/028859, filed Apr. 24, 2019 which was published in accordance with PCT Article 21(2) on Oct. 31, 2019, in English, and which claims the benefit of European Patent Application No. 18305537.5, filed Apr. 27, 2018.

TECHNICAL FIELD

The present embodiments generally relate to video encoding and decoding, particularly, entropy encoding and decoding based on at least one implementation of neural network for CABAC.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

In the High Efficiency Video Coding (HEVC) standard ("ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), a Context-adaptive binary arithmetic coding CABAC is used for entropy coding. The coding of data consists in associating symbols of different length to the data to be encoded. To obtain an efficient entropy coding, more common symbols are represented using fewer bits than less common symbols.

The present invention proposes several schemes to improve the CABAC as implemented in HEVC or in any other application involving entropy coding of numerical data.

SUMMARY

According to an aspect of the present disclosure, a method of video encoding is provided including accessing a bin of a syntax element associated with a block in a picture of a video, determining a context for the bin of the syntax element, and entropy encoding the bin of the syntax element based on the determined context. According to a first embodiment, accessing a bin of a syntax element comprises determining, for the syntax element, a prediction of the syntax element by applying a neural network model on data encoded prior to the syntax element and determining a bin of the syntax element based on the relevance of the prediction of the syntax element. According to a second embodiment, determining a context for a bin of the syntax element comprises determining, a probability associated with the context using a neural network model and data encoded prior to the syntax element. According to a particular characteristic, data encoded prior to said syntax element comprises spatial and temporal information relative to a block previously encoded or to the current block.

According to an aspect of the present disclosure, an apparatus for video encoding is provided, the apparatus including means for accessing a bin of a syntax element associated with a block in a picture of a video, means for determining a context for the bin of the syntax element and means for entropy encoding the bin of the syntax element based on the determined context. According to a first embodiment, means for accessing a bin of a syntax element comprises a neural network for determining, for the syntax element, a prediction of the syntax element using data encoded prior to the syntax element and determining a bin of the syntax element based on the relevance of the prediction of the syntax element. According to a second embodiment, means for determining a context for a bin of the syntax element comprises a neural network for determining a probability associated with the context using data encoded prior to the syntax element.

According to an aspect of the present disclosure, an apparatus for video encoding is provided, the apparatus including a processor, and at least one memory coupled to the processor, the processor being configured to access a bin of a syntax element associated with a block in a picture of a video, determine a context for the bin of the syntax element and entropy encode the bin of the syntax element based on the determined context. According to a first embodiment, the processor is configured as a neural network for determining, for the syntax element, a prediction of the syntax element using data encoded prior to the syntax element and determining a bin of the syntax element based on the relevance of the prediction of the syntax element. According to a second embodiment, the processor is configured as a neural network for determining, a probability associated with the context using data encoded prior to the syntax element.

According to an aspect of the present disclosure, a bitstream formatted to include encoded data representative of a block of a picture, the encoded data encoded by accessing a bin of a syntax element associated with a block in a picture of a video, determining a context for the bin of the syntax element and entropy encoding the bin of the syntax element based on the determined context. According to a first embodiment, accessing a bin of a syntax element comprises determining, for the syntax element, a prediction of the syntax element by applying a neural network model on data encoded prior to the syntax element and determining a bin of the syntax element based on the relevance of the prediction of the syntax element. According to a second embodiment, determining a context for a bin of the syntax element of a syntax element comprises determining a probability associated with the context, using a neural network model and data encoded prior to the syntax element.

According to an aspect of the present disclosure, a signal including a bitstream formatted to include encoded data representative of a block of a picture, the encoded data encoded by accessing a bin of a syntax element associated with a block in a picture of a video, determining a context for the bin of the syntax element and entropy encoding the bin of the syntax element based on the determined context.

According to a first embodiment, accessing a bin of a syntax element comprises determining, for the syntax element, a prediction of the syntax element by applying a neural network model on data encoded prior to the syntax element and determining a bin of the syntax element based on the relevance of the prediction of the syntax element. According to a second embodiment, determining a context for a bin of the syntax element of a syntax element comprises determining a probability associated with the context using a neural network model and data encoded prior to the syntax element.

According to an aspect of the present disclosure, a method of video decoding is provided including accessing an encoded bin of a syntax element associated with a block in a picture of an encoded video, determining a context for the bin of the syntax element and entropy decoding the encoded bin of the syntax element based on the determined context. According to a first embodiment, entropy decoding a bin of a syntax element comprises determining, for the syntax element, a prediction of the syntax element by applying a neural network model on data decoded prior to the syntax element and determining the syntax element responsive to the prediction of the syntax element and the decoded bin of the syntax element. According to a second embodiment, determining a context for a bin of the syntax element comprises determining a probability associated with the context using a neural network model and data decoded prior to the syntax element.

According to an aspect of the present disclosure, an apparatus for video decoding is provided, the apparatus including means for accessing an encoded bin of a syntax element associated with a block in a picture of an encoded video, means for determining a context for the bin of the syntax element and means for entropy decoding the encoded bin of syntax element based on the determined context. According to a first embodiment, means for entropy decoding a bin of a syntax element comprises a neural network for determining, for the syntax element, a prediction of the syntax element using data decoded prior to the syntax element and determining the syntax element responsive to the prediction of the syntax element and the decoded bin of the syntax element. According to a second embodiment, means for determining a context for a bin of the syntax element of a syntax element comprises a neural network for determining a probability associated with the context using data decoded prior to the syntax element.

According to an aspect of the present disclosure, an apparatus for video decoding is provided, the apparatus including a processor, and at least one memory coupled to the processor, the processor being configured to access an encoded bin of a syntax element associated with a syntax element and entropy decode the encoded bin of the syntax element based on the determined context. According to a first embodiment, the processor is configured to implement a neural network for determining, for the syntax element, a prediction of the syntax element using data decoded prior to the syntax element and determining the syntax element responsive to the prediction of the syntax element and to the decoded bin of the syntax element. According to a second embodiment, the processor is configured to implement a neural network for determining a probability associated with the context using data decoded prior to the syntax element.

According to an aspect of the present disclosure, a computer-readable program product is provided including program code instructions for accessing a bin of a syntax element associated with a block in a picture of a video, determining a context for the bin of the syntax element and entropy encoding the bin of the syntax element based on the determined context according to any of the first or second embodiment.

According to an aspect of the present disclosure, a computer-readable program product is provided including program code instructions for accessing an encoded bin of a syntax element associated with a block in a picture of an encoded video, determining a context for the bin of the syntax element and entropy decoding the encoded bin of the syntax element based on the determined context according to any of the first or second embodiment.

According to an aspect of the present disclosure, a computer-readable storage medium carrying a software program is provided including program code instructions for accessing a bin of a syntax element associated with a block in a picture of a video, determining a context for the bin of the syntax element and entropy encoding the bin of the syntax element based on the determined context according to any of the first or second embodiment.

According to an aspect of the present disclosure, a computer-readable storage medium carrying a software program is provided including program code instructions for accessing an encoded bin of a syntax element associated with a syntax element, and entropy decoding the encoded bin of the syntax element based on the determined context according to any of the first or second embodiment.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
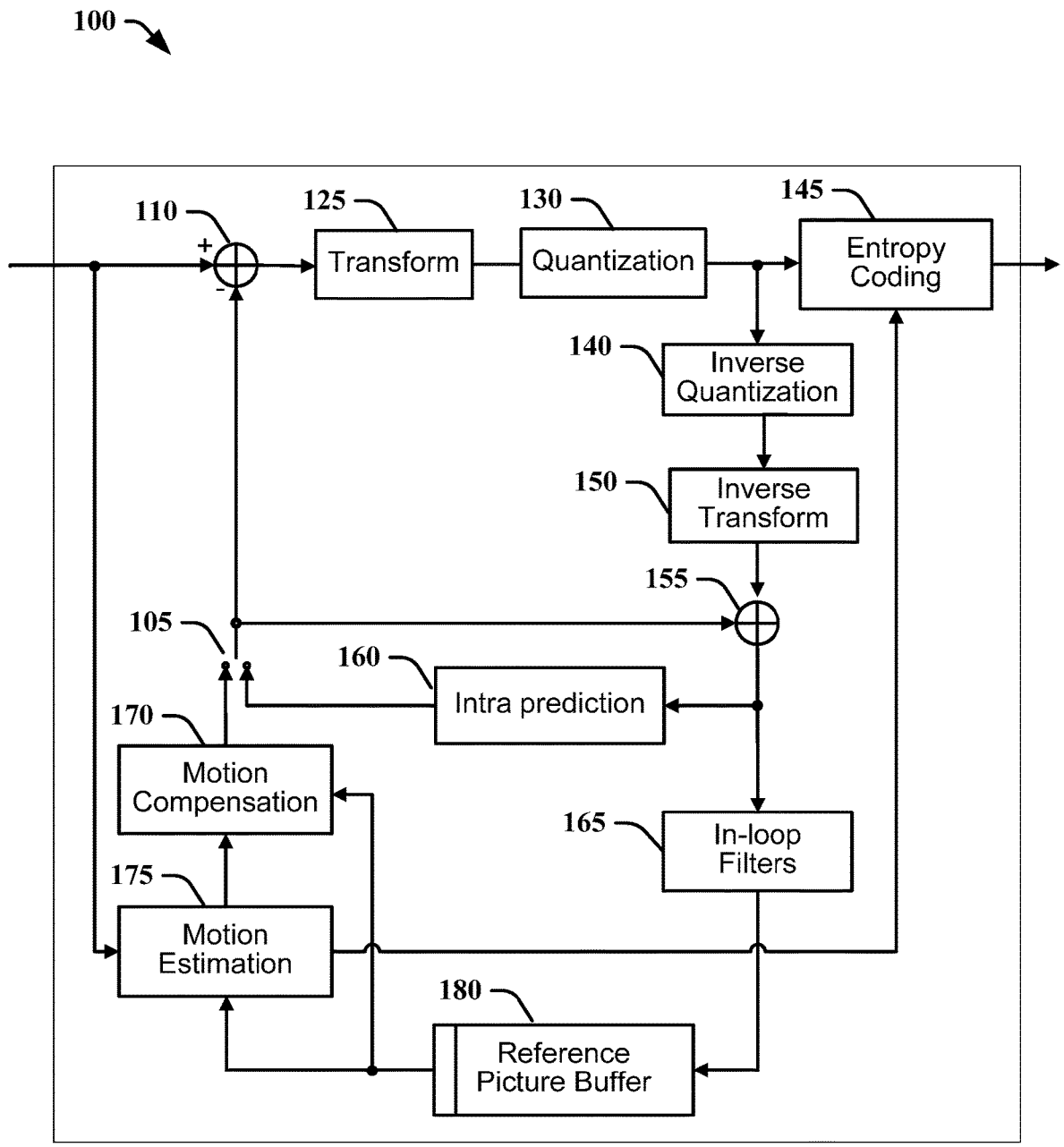
FIG. 1 illustrates a simplified block diagram of an exemplary video encoder in accordance with anyone of the embodiments of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present disclosure, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

It is to be understood that a picture is an array of Luma samples in monochrome format, or an array of Luma samples and two corresponding arrays of Chroma samples in 4:2:0, 4:2:2, and 4:4:4 color format. In HEVC, a "block" addresses a specific area in a sample array (e.g., Luma Y), and a "unit" includes the collocated block of all encoded color components (Luma Y and possibly Chroma Cb and Chroma Cr), syntax elements and prediction data that are associated with the block (e.g., motion vectors). However, the term "block" is more generally used herein to refer to a block (e.g. a coding block (CB), transform block (TB), coding group (CG), etc.) or a unit (e.g. a CU).

It is to be understood that a picture or block of pixels or transform coefficients is a two-dimensional array or matrix. The horizontal or x direction (or axis) represents a width and the vertical or y direction (or axis) represents a height. The indexes start at 0. The x direction represents columns and the y direction represents rows. The maximum x index is the width−1. The maximum y index is the height−1.

In the following sections, the words "reconstructed" and "decoded" may be used interchangeably. Usually but not necessarily "reconstructed" is used on the encoder side while "decoded" is used on the decoder side. Also, the words "coded" and "encoded" may be used interchangeably. Moreover, the words "image", "picture" and "frame" may be used interchangeably. Furthermore, the words "coding", "source coding" and "compression" may be used interchangeably.

The present disclosure is directed to techniques for video or image encoding and decoding (also known as source coding and decoding) where the efficiency of the entropy coding and decoding of syntax element is improved by using neural networks. In particular, the CABAC encodes symbols (or syntax elements) and maintains probability modeling for more frequently used bits of any symbol. The probability models can be selected adaptively based on local context, allowing better modeling of probabilities, because coding modes are usually locally well correlated. The performance of the CABAC therefore relies on those 2 features: the frequency of a symbol and the modeling of probabilities for the symbol based on local context. Two alternative embodiments of neural networks implementation for CABAC are described that increase entropy coding efficiency. In the first embodiment, a neural network improves the distribution of the symbol to code. In the second embodiment, the modeling of the distribution to code is improved by a neural network. Although described for video encoding and decoding, the present principles are compatible with still images encoding and/or decoding using entropy coding and/or decoding.

Encoding

FIG. 1 illustrates a simplified block diagram of exemplary video encoder 100 in accordance with an embodiment of the present disclosure. The encoder 100 may be included in a transmitter or headend in a communication system. To encode a video sequence with one or more pictures, a picture may be partitioned into CTUs of square shape with a configurable size. A consecutive set of CTUs may be grouped into a slice. A CTU is the root of a QTBT partitioning into CUs. In the exemplary encoder 100, a picture is encoded by the encoder modules as described below. Each block is encoded using either an intra mode or inter mode. When a block is encoded in an intra mode, the encoder 100 performs intra prediction (module 160). In an inter mode, motion estimation (module 175) and compensation (module 170) are performed. The encoder decides (module 105) which one of the intra mode or inter mode to use for encoding the block, and indicates the intra/inter decision by a prediction mode flag. Residuals are calculated by subtracting (module 110) a predicted sample block (also known as a predictor) from the original image block.

As an example, blocks in intra mode are predicted from reconstructed neighboring samples. Inter prediction is performed by performing motion estimation (module 175) and motion-compensating (in module 170) a reference block stored in a reference picture buffer 180. The motion estimation module 175 may include motion compensation since its purpose is to determine the best motion vectors which may use an iterative search that typically terminates when the rate-distortion cost (RD cost) is low enough, or has reached a minimum.

The residuals are transformed (module 125) and quantized (module 130). The transform module 125 may transform the image from the pixel or time domain to the transform or frequency domain. The transform may be may be, e.g., a cosine transform, a sine transform, a wavelet transform, etc. Quantization may be performed according to, e.g., a rate distortion criterion. The quantized transform coefficients, as well as motion vectors and other syntax elements, are entropy coded (module 145) to output a bitstream. The entropy coding may be, e.g., Context Adaptive Binary Arithmetic Coding (CABAC), Context Adaptive Variable Length Coding (CAVLC), Huffman, arithmetic, exp-Golomb, etc. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied, and the block samples are directly coded into the bitstream.

The encoder comprises a decoding loop and thus decodes an encoded block to provide a reference for further predictions. The quantized transform coefficients are de-quantized (module 140) and inverse transformed (module 150) to decode residuals. An image block is reconstructed by combining (module 155) the decoded residuals and the predicted sample block. An in-loop filter (165) may be applied to the reconstructed picture, for example, to perform deblocking/Sample Adaptive Offset (SAO) filtering to reduce coding artifacts. The filtered image is stored in the reference picture buffer 180.

The modules of video encoder 100 may be implemented in software and executed by a processor, or may be implemented by well-known circuits by one skilled in the art of compression. In particular video encoder 100 may be implemented as an integrated circuit (IC).

The modules of video encoder 100 may also be present in other video encoders (e.g., HEVC encoders), except for the differences described in the present disclosure, particularly, differences in the entropy coding module 145, as will be described in greater detail in the following paragraphs and figures. For functionalities other than entropy encoding (e.g., modules other than 145), video encoder 100 may be similar to an HEVC video decoder and the functionalities are not herein described in detail.

Entropy Encoding

In the HEVC and AVC standards, syntax element may be entropy coded and decoded using CABAC.

CABAC is based on arithmetic coding and has been adopted by the HEVC and AVC standards. CABAC may use multiple probability models for different contexts. It first converts all non-binary symbols to binary. In particular, syntax elements are binarized (i.e. represented as a sequence of binary symbols called bins, each equal to a '0' or '1'). Then, for each bin, the encoder selects which probability model to use (identifying the probability of a bin being a '0' or a '1'), and may utilize information from nearby elements (or context) to optimize the probability estimate.

Figure 2:
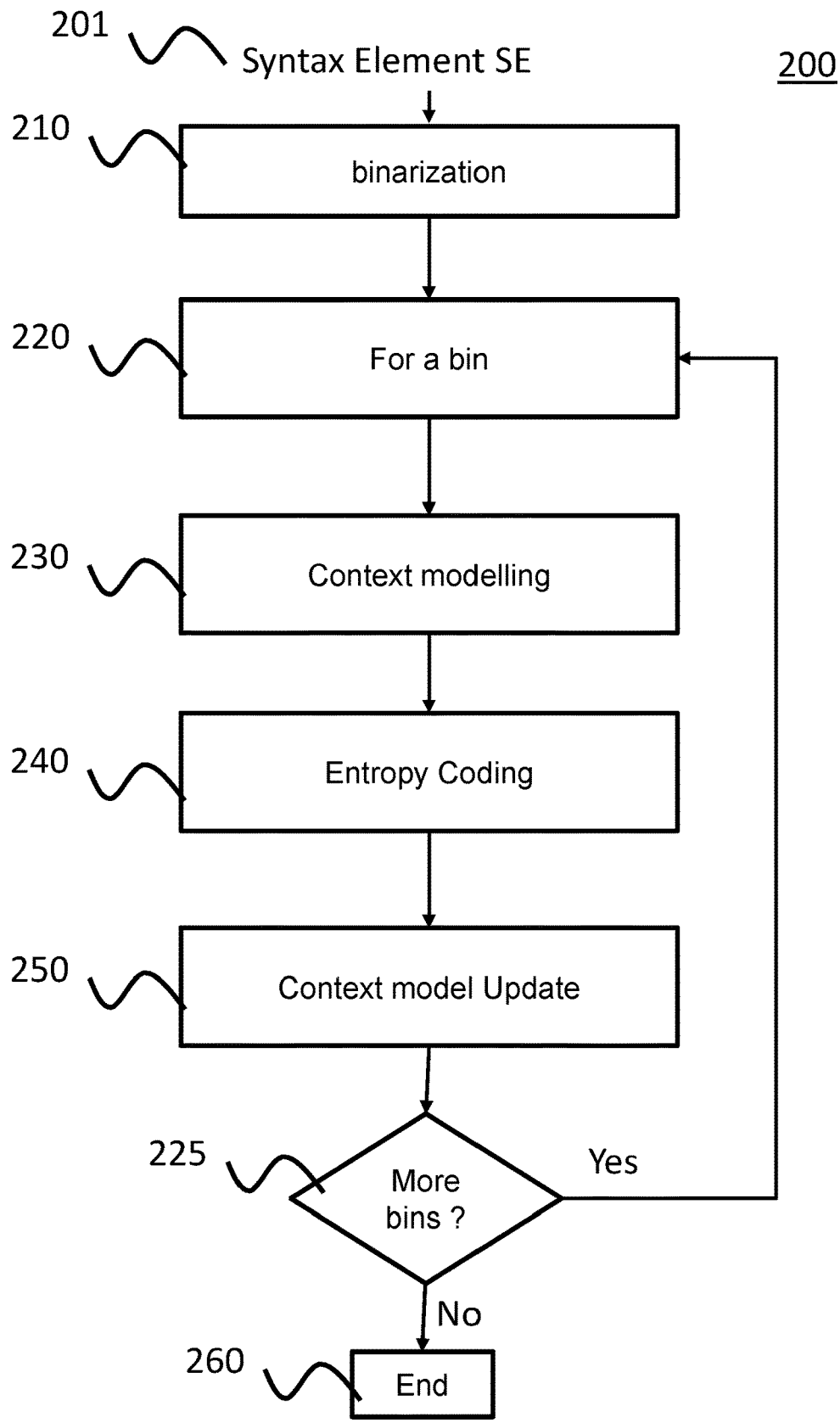
FIG. 2 illustrates a flowchart of an exemplary method of context-based entropy coding in accordance with the prior art.

FIG. 2 illustrates a flowchart 200 of an exemplary method of context-based entropy coding (e.g., CABAC) in accordance with the prior art. At step 210, the syntax element (SE) 201, when not already a binary value (such as a binary flag), is first binarized. Then, within loop 220, for a bin:

a. At step 230, a context CTX is selected based on contextual information of the syntax element or bin to code. The context CTX is associated to a context model that stores the contextual probability of the bin being "1" or "0". The contextual probability corresponds to the estimated conditional probability that the bin takes the value "b" knowing the context value CTX, i.e., P(b/CTX). The selection is based on contextual information, such as already-coded symbols (syntax elements) in the neighborhood of the current symbol (syntax element) to encode, the CU size or shape, or the slice type;

b. At step 240, the bin is encoded using an entropy encoder (e.g., arithmetic encoder) according to the contextual probability P(b/CTX);

c. At step 250, once the bin is coded, the context model is updated, i.e., the contextual probabilities, P(0/CTX) and P(1/CTX), are updated. For example, the update may represent a count update of the number of occurrences of the bin value ("0" or "1").

d. At step 225, a check is performed if there are more bins to encode. If yes, then return to step 220 (e.g., by moving to the next bin of the syntax element); otherwise, end the process at step 260.

Without loss of generality, steps 240 and 250 may be switched in order or be performed in parallel.

Figure 3:
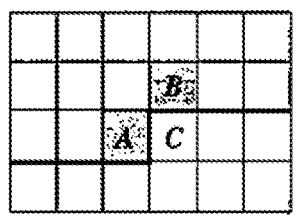
FIG. 3 illustrates an exemplary context modeling for a non-limiting particular example of syntax element in accordance with the prior art.

As an example, consider a syntax element SE corresponding to a positive integer value where several context models are associated to the syntax element. For instance, as illustrated on FIG. 3, the positive integer value corresponds to the Motion Vector Difference with prediction (MVD). The value $e=|MVD_A|+|MVD_B|$ is used to select which context model to use among 3 models, where $MVD_A$ and $MVD_B$ are the previously coded values of MVD for the left block A and above block B respectively of the current coded block C, as depicted in FIG. 3. The following steps may apply:

Binarization (e.g., 210): the positive integer value is converted to a bin string by unary coding as follows.
SE=0→bin string="0"
SE=1→bin string="10"
SE=2→bin string="110"
. . . .

Context modeling (e.g., 230): the following contexts models are defined for the different bins of the bin string
Bin 0→3 contexts, 0, 1, 2, depending on the values of the previously coded SE, $SE_{PREV}$
If $(0<=SE_{PREV}<3)$→model 0
If $(3<=SE_{PREV}<33)$→model 1
If $(33<=SE_{PREV})$→model 2
Other bins→model 3

An HEVC CABAC encoder (step 250) has two main modes: regular coding and bypass coding. The bypass coding mode may be chosen for bins related to sign information or for lower significant bins, which are assumed to be uniformly distributed and for which, consequently, the regular binary arithmetic encoding process is bypassed. In the regular coding mode, a bin value is encoded by using the regular arithmetic encoding process, where the associated probability model is either determined by a fixed choice, without any context modeling, or adaptively chosen depending on the related context model.

For context-based coding, a conditional probability model is used to skew the distribution of the data. Arithmetic coding is finally applied to compress the data. A proper choice of the context, hence the probability model for each bit allows for an increased compression efficiency. The context models may be indexed and identified by the context index. CABAC and other context-based encoders and decoders are well-known by those skilled in the art of compression and are not herein described in detail.

Figure 4:
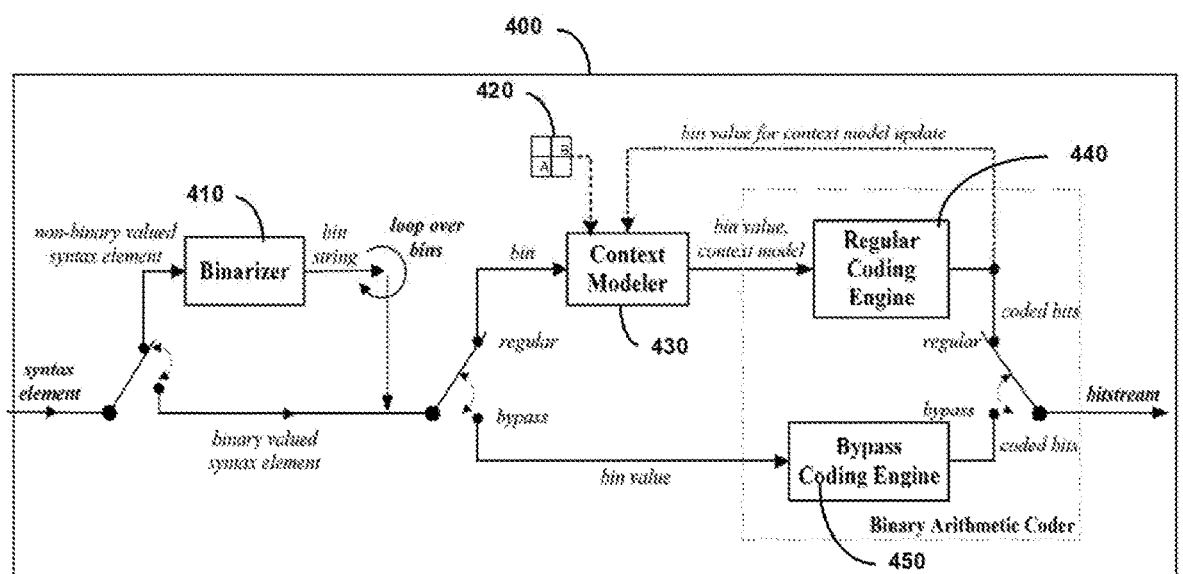
FIG. 4 illustrates a simplified block diagram of an exemplary CABAC encoder in accordance with the prior art.

FIG. 4 illustrates a CABAC encoder according to prior art. The steps of binarization 210 may be performed by, e.g., binarizer module 410. The step of context modeling 230 may be performed by, e.g., context modeler module 430 from local context 420 and from an update based on the actual coded bin value. Such data may have been stored in memory. The steps 250 of regular coding and bypass coding may be performed by, e.g., regular coding engine 440 and bypass coding engine 450.

The present disclosure applies to general context-based entropy encoders (e.g., CABAC encoders) and relates to determining either a prediction of the element or of the contexts models used for the entropy compression of elements (e.g., syntax elements or syntax element bins) using neural network models, which may provide more compression efficiency. In particular the present disclosure is directed to determining, for the syntax element, a prediction of the syntax element by applying a neural network model on data encoded prior to the syntax element and to coding the relevance (e.g. the difference) of the prediction of the syntax element rather than the syntax element itself. The present disclosure is further directed to determining contexts models of a syntax element and the probability associated with the context model by applying a neural network model on data encoded prior to the syntax element as will be described in greater detail in the following paragraphs and figures.

Improved Distribution of the Element to Code

According to an embodiment of the present disclosure, video encoder 100 generally include an entropy coder 500 or follows the method of entropy encoding 600 described above, with implementation of neural networks in the encoding (and corresponding decoding) of a prediction of the syntax element. The modifications will be described in greater detail in the following paragraphs and figures.

Figure 5:
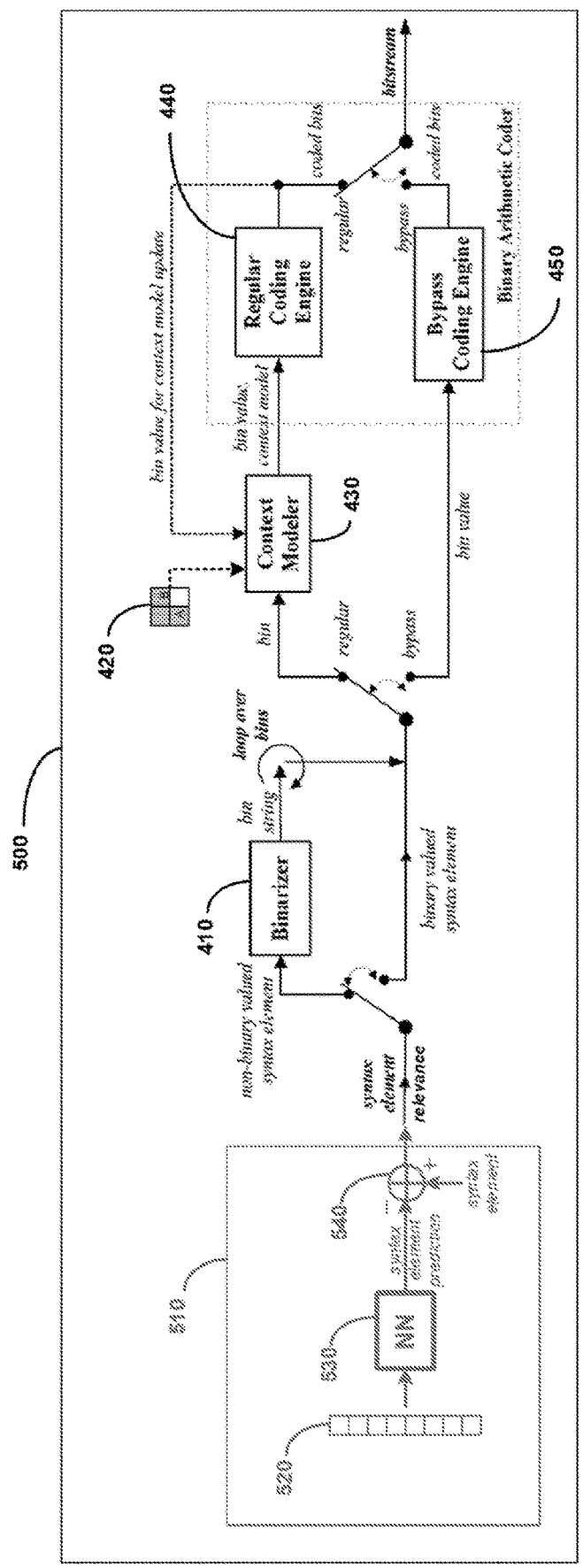
FIG. 5 illustrates a simplified block diagram of an exemplary CABAC encoder in accordance with a first embodiment of the present disclosure.

FIG. 5 illustrates a CABAC encoder according a first embodiment of the present principles. The syntax element to encode is predicted with a Neural Network (NN) 530 from input data 520. The relevance of the prediction of the syntax element with regard to the syntax element is coded rather than the syntax element itself. As for syntax elements, the relevance is either a binary value (such as a binary flag) or a non-binary value such as an integer with a limited range or may takes N values identified by an index. The binarizer 410, the context modeler 430, regular or bypass coding engine 440, 450 are not modified, only the element to code is pre-processed 510 and the relevance of the prediction used rather the syntax element.

According to a first variant, the relevance of the prediction is obtained by the XOR between the syntax element and its prediction. This variant is well adapted to case where the syntax element is a flag.

According to a second variant, the relevance of the prediction is obtained by the difference 540 between the syntax element and its prediction. This variant is well adapted to case where the syntax element is an integer value with a limited range or where the syntax element may take N (N being a positive integer) values identified by an index.

According to a third variant, the prediction is an ordered vector of probabilities for a plurality of values for the syntax element and the relevance is the index in the ordered vector of probabilities. This variant is well adapted to case where the syntax element is an integer value with a limited range or where the syntax element may take N (N being a positive integer) values identified by an index. In this variant, one can code the relevance or the syntax element itself.

According to a fourth variant, the Neural Network is a classifier where the last layer output is a vector giving the N probabilities for each of the possible value. In a variant, the last layer is a softmax. Then one can derive a codeword for each of the syntax element values based on the associated probability. For example, the codeword length may be a function of the probability using Huffman coding for example.

Figure 7:
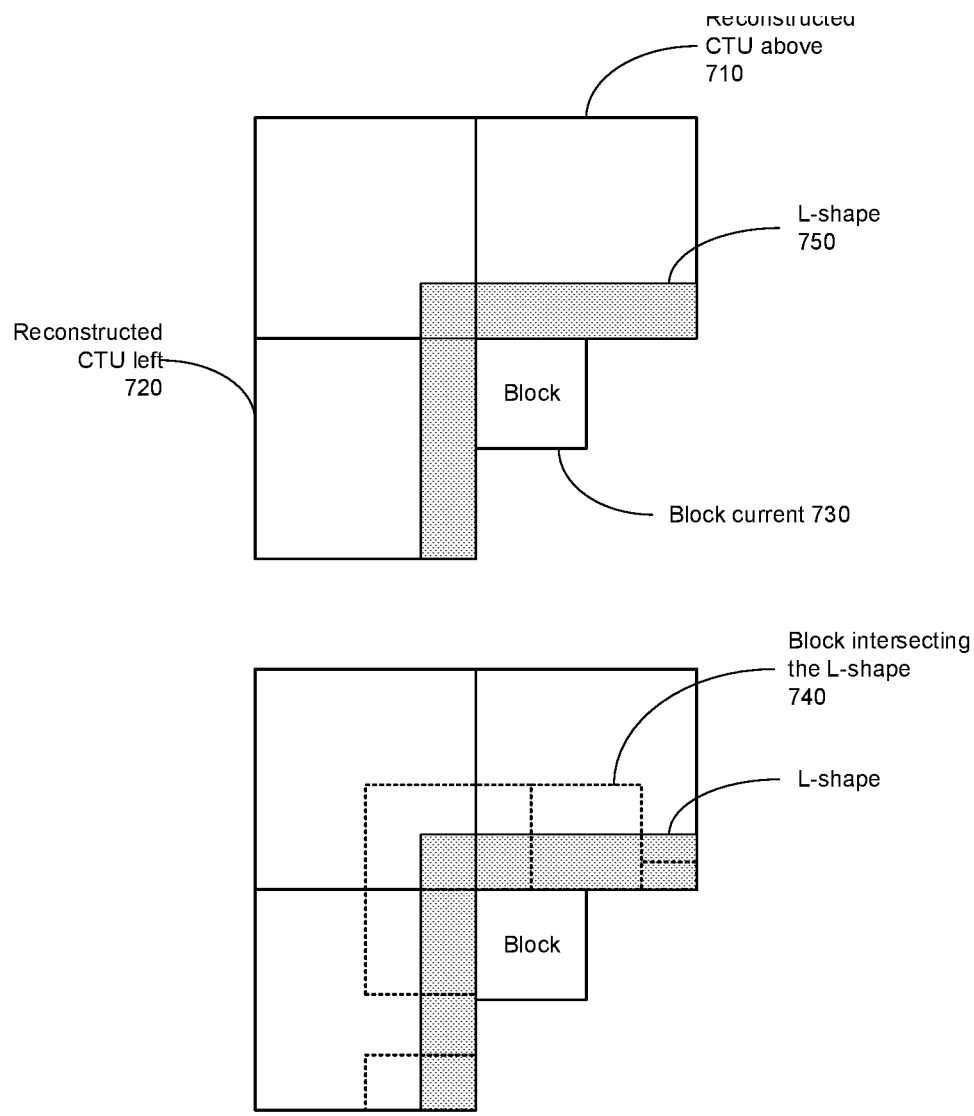
FIG. 7 illustrates possible data input to the NN in accordance with anyone of embodiments of the present disclosure.

The input data 520 to the NN 530 are adapted to syntax element to code. Advantageously, the NN allows to inputs complex data, such as spatial and/or temporal information relative to a block previously encoded or to the current block. According to non-limiting examples, the data encoded prior to the syntax element can contain at least one among:

the values of a previously encoded (or decoded) syntax elements of the same type in a neighborhood of the block (ex: above or left blocks 710, 720, or blocks 740 intersecting the L-shape 750 as shown on FIG. 7)

the reconstructed samples in the L-shape 750 of the current block;

the prediction samples of the current block;

the reconstructed residuals of the current block;

the samples in the L-shape of the reference block in inter;

the motion field for the block when the block is coded in inter;

the prediction samples of the block generated with motion compensation using the motion filed;

the quantization parameter QP;

the block size and/or shape.

For instance, in an encoder, in case of inter mode prediction, one can use the previously decoded motion vectors in the neighborhood of the current CU, or using an history-based buffer containing previously decoded motion vectors, and the temporal co-located motion vectors. Indeed, the motion field characteristics has more chance to be continuous or to produce patterns that repeat over time or which can be correlated with the texture (re-constructed samples in the L-shape). This correlation may be learned by the neural network so that it may predict current motion (or MV difference (MVD) with one predictor, or associated Syntax Elements associated with MVD such as "mvd_greater_than0", "mvd_greater_than1","abs_mvd", etc . . . ) or other inter coded parameters for this CU efficiently.

For instance, in an encoder, in case of inter mode prediction, the NN may learn how to predict the current transform parameters (e.g. multiple transform size—MTS, secondary transform—NSST) from the previously decoded transform type and transform size, the previously decoded residuals values and the reconstructed samples in the neighborhood and in the reference pictures typically.

In another example, the Local Illumination Compensation (LIC) parameters (e.g. LIC-flag) may be predicted with NN based on input data such as reconstructed samples in the neighborhood, in the reference pictures and previously derived LIC parameters values, since the illumination variation may be bound to the same objects in the sequence which may caraterized with their shape or texture typically.

In another example, the encoder may determine unequal weights in case of bi-prediction (e.g. gbi-index syntax element) generally based on rate-distorsion optimization (RDO). It may turns out this choice can be correlated with the relative accuracy of the reconstructed CUs used to build the two predictions which may be learned with a NN-based architecture.

Figure 6:
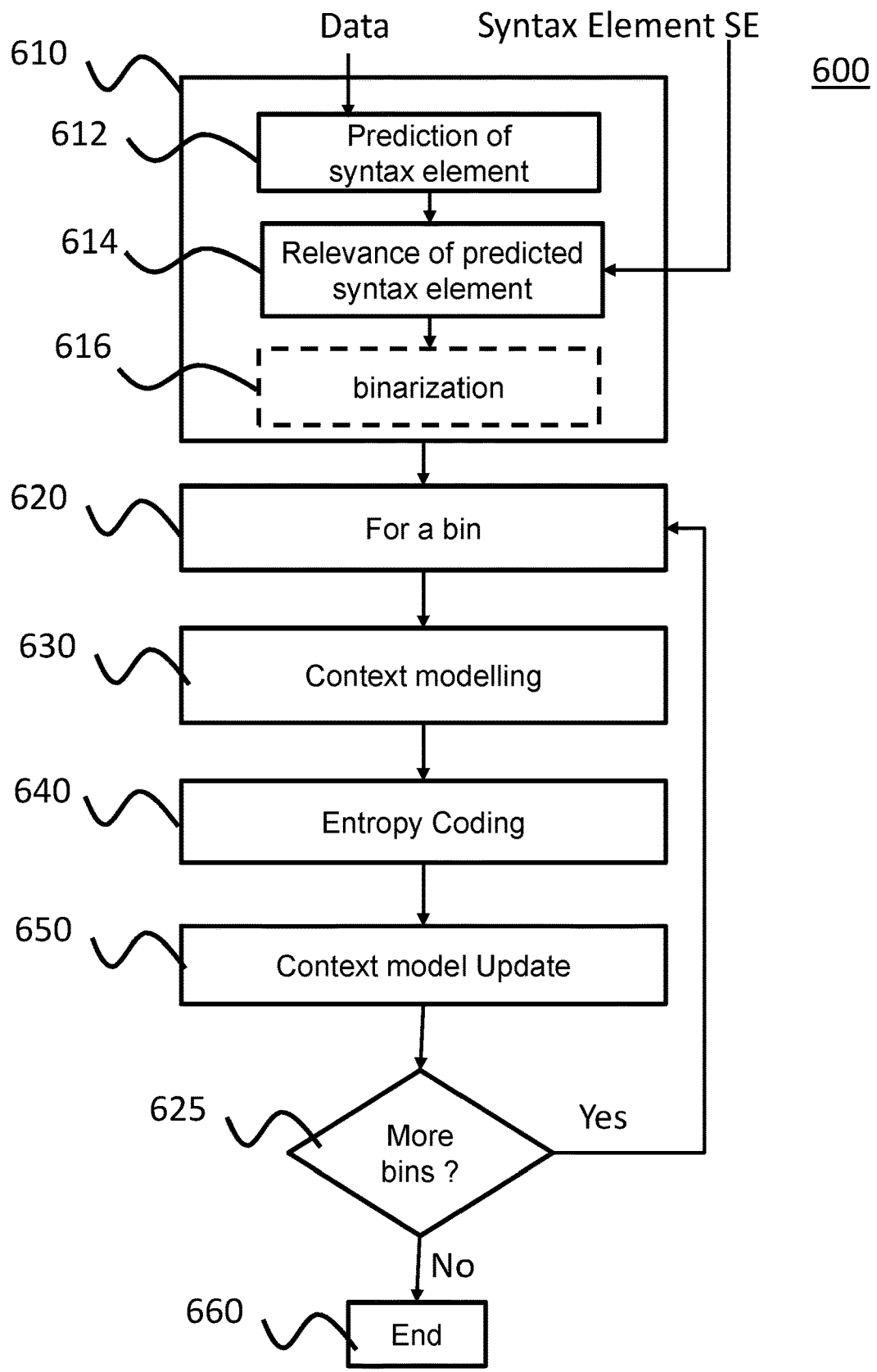
FIG. 6 illustrates a flowchart of an exemplary method of context-based entropy coding in accordance with a first embodiment of the present disclosure.

FIG. 6 illustrates a flowchart 600 of an exemplary method of context-based entropy coding (e.g., CABAC) in accordance with an exemplary embodiment. FIG. 6 has similarities with FIG. 4. Steps 620, 630, 640, 650, 625 and 660 are similar to steps 420, 430, 440, 450, 425 and 460, respectively except that the element to code is distinct. Step 610 has important differences from step 410, as explained below.

At step 610, a binary value for the syntax element (SE) associated with a current block in a picture of a video is accessed. This step 610 comprises 3 sub-steps namely, the prediction 612 of the syntax element using NN, the determination 614 of the relevance of the prediction with respect to the syntax element, and when needed the binarization 616 of the relevance of the prediction. According to a first embodiment, the binary value to code is representative of the relevance of a prediction of the syntax element. Thus, in a step 612, a prediction of the syntax element is obtained by applying a neural network model on data encoded prior to the syntax element. Then, in a step 614, the prediction of the syntax element is compared with the syntax element and the relevance of the prediction is determined and used for determining in a step 616 the bin to code for the syntax element.

In a variant where the syntax element is a flag, the prediction of the syntax element is the binary value. Therefore, a XOR between the prediction of the flag and the flag results into a value '0' as bin to code when the prediction is relevant, i.e. correct, and results into a value '1' as bin to code when the prediction fails. Thus, a sequence of relevant predictions results in a sequence of zero values to code and entropy coding is improved.

In another variant where the syntax element may take N values, the Neural Network is a classifier where the last layer output is a vector giving the N probabilities for each of the possible value. Such variant is well adapted to syntax element being a coding mode such as an Intra prediction, a motion prediction as shown on FIG. 3, a coefficient of residuals transform. Typically, it can be a small classifier like a multilayer perceptron (MLP) with 3 layers+softmax for example. Then the N probabilities are re-ordered from the highest to the lower probability as shown in table 1. If the value (Value A) corresponding to the highest probability, corresponding to an index '00', is equal to the syntax element, the index '00' then results into bin values '0', '0' as bins to code. The prediction is relevant and compression improved. Else, if the value (Value C) corresponding to the second highest probability, corresponding to an index '01', is equal to the syntax element, the index '01' then results into values '0', '1' as bin to code.

TABLE 1

| SE values ordered by probability | N = 4 | 2 bits |
|---|---|---|
| Value A | 0 | 00 |
| Value C | 1 | 01 |
| Value B | 2 | 10 |
| Value D | 3 | 11 |

In another variant, the output probabilities are processed. One considers the integer K (K<=N) defined as the greatest integer verifying (1):

$$\Sigma_{k=1}^{K} p(k) < S_P \quad (1)$$

Where $S_P$ is a predefined threshold.

In another variant, one considers the integer K (K<=N) defined as the greatest integer verifying (2):

K=card {k<N, such that p(k)>$T_P$} that is the number of modes having probability superior to a threshold, where $T_P$ is a predefined threshold.

If the syntax element to encode is one of the first K MPM modes, the index of the syntax element is encoded with log 2(K) bins. Else, the syntax element is encoded with log 2(N−K) bits as shown in the example in Table 2.

Table 2 illustrates an example of coding K=4 most probably modes with 2 bits and other less probable modes with 4 bits.

| K = 4 | 2 bits |
|---|---|
| 0 | 00 |
| 1 | 01 |
| 2 | 10 |
| 3 | 11 |
| N = 20, (N − K) = 16 | 4 bits |
| 4 | 0000 |
| 5 | 0001 |
|  | . . . |
| 19 | 1111 |

Once the bin to code is determined by the NN, then the same steps as described with method of FIG. 2 are processed. Within a loop 620, for a bin of a context element:
- a) At step 630, a context CTX for the bin of the syntax element is determined based on contextual information of the syntax element or bin to code.
- b) At step 640, the bin is encoded using an entropy encoder (e.g., arithmetic encoder) according to the contextual probability P(b/CTX);
- c) At step 650, once the bin is coded, the context model is updated for the next bin to code, i.e contextual probability P(b/CTX) is modified based on the coded bin for the context CTX.

Then, the next bin is processed. Finally, a next syntax element is processed by repeating the process 600.

Figure 8:
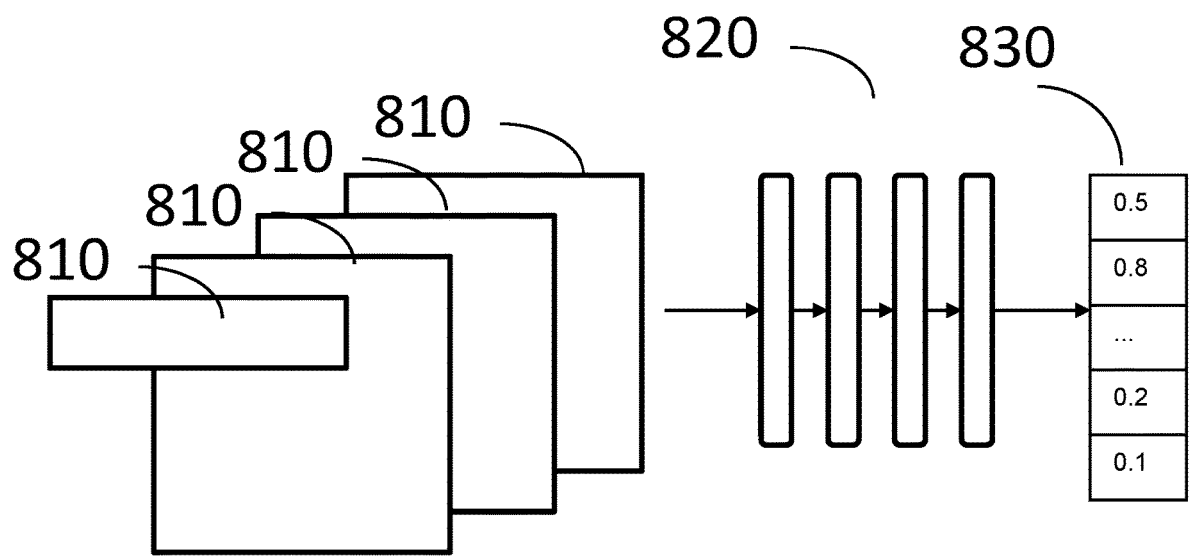
FIG. 8 illustrates a NN with multi-components input for with anyone of embodiments of the present disclosure.

For the sake of completeness, FIG. 8 illustrates a NN with multi-components input for use in the present embodiment. Each component 810 is a channel of various size. For instance, the size of input channel is equal to the size of one block for inputs such as prediction samples or residuals of the reconstructed block. For instance, the size of input channel is equal to one or two values for inputting the values of the syntax element of above and left blocks, or for inputting the QP value of the current block. Each component 810 is an input of the NN 820. In a nutshell, the inputs are data with a correlation with the syntax element to predict. For instance, in an encoder, in case of inter slice, the splitting of a block mostly depends on the underlying motion and on the prediction coming from the motion compensated block. Accordingly, the inputs of the NN for inter image partitioning are derived from motion compensation information associated to the block and the syntax element representative of the splitting is predicted based on these inputs. Advantageously, the Neural Network is composed of convolutional layers. The output of the NN is a prediction vector 830 of value probabilities. Note that the NN 820 can contain other types of layers (MaxPool which takes a maximum value from each cluster of neurons at a previous layer, Addition, fully connected etc.).

According to a particular embodiment, a plurality of NN are implemented according to different prediction domain. Thus, a first NN is trained for Intra prediction and related syntax elements; a second NN is trained for Inter prediction and related syntax elements. In yet another embodiment, a NN is trained according to the sequence number of the picture in the GOP. In yet another embodiment, a NN is trained according to the type of video or image (HDR, film, sport . . . ) or transmission (reduced bit rate, video conference . . . ). Any combination or arrangement of the one or more NN(s) are therefore compatible with the present disclosure. The skilled in the art will appreciate that the training of the one or more NN(s) for entropy coding does not deviate from usual framework for training a NN. The NN provides a prediction vector of syntax element using its current parameters. The prediction vector and the syntax element value are compared using a loss function. For example, the Mean Squared Error is used to evaluate the vectors. This loss is then used to derive/tune new parameters of the NN through an optimization process. Once this NN is trained on a very large set of images and its parameters (weights) are set, the NN can be directly used by the encoder or sent to the decoder.

Thus, according to another particular embodiment, the NN(s) are trained offline, and either the weights of the NN are transmitted to the decoder, or the decoder implements n (n being an positive integer) known trained NNs and an indication of a NN among the n NNs is transmitted to the decoder for instance in a SPS, PPS or slice header.

According to another particular embodiment, the NN(s) are trained online on the fly in both encoder and decoder.

Improve Context Modeling of the Distribution of the Element to Code

According to another embodiment of the present disclosure, video encoder 100 generally include an entropy coder 900 or follows the method of entropy encoding 1000 described above, with implementation of neural network to determine and update the probabilities of the context model in the entropy coding (and corresponding decoding) of the syntax element. The modifications will be described in greater detail in the following paragraphs and figures.

Figure 9:
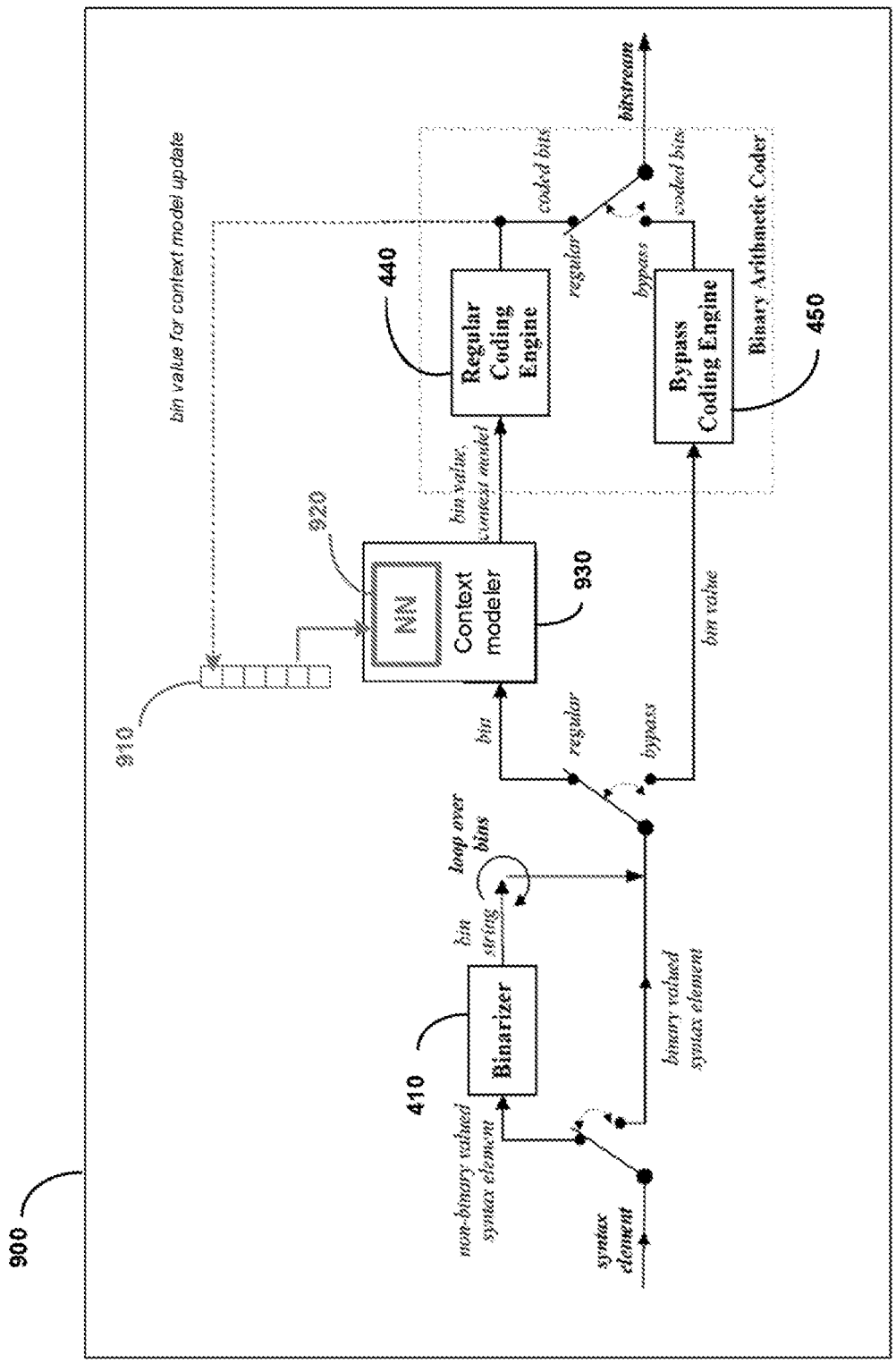
FIG. 9 illustrates a simplified block diagram of an exemplary CABAC encoder in accordance with a second embodiment of the present disclosure.

FIG. 9 illustrates a CABAC encoder according a second embodiment of the present principles. The probabilities associated with one context model used to encode a syntax element are predicted with a Neural Network (NN) 920 from input data 910 and from coded bin value. The NN 920 is part of the context modeler 930. The other parts of the CABAC encoder including binarizer 410, regular coding engine 440 and bypass coding engine 450 are not modified.

The input data 910 to the NN 920 are adapted to syntax element to code. Advantageously, the NN allows to inputs complex data, such as spatial and/or temporal information relative to a block previously encoded or to the current block. According to non-limiting examples, the data encoded prior to the syntax element can contain at least one among:

the values of a previously encoded (or decoded) syntax elements of the same type in a neighborhood of the block (ex: above or left blocks 710, 720, or blocks 740 intersecting the L-shape 750 as shown on FIG. 7). Advantageously, these values may be managed using an history-based buffer filled with the N1 last (different) previously coded values and/or other N2 values in the neighborhood of the current block but that could have been decoded less recently than the N1 values (in the above CTU row for instance).

the reconstructed samples in the L-shape 750 of the current block;

the prediction samples of the current block;

the reconstructed residuals of the current block;

the samples in the L-shape of the reference block in inter;

the motion field for the block when the block is coded in inter;

the prediction samples of the block generated with motion compensation using the motion filed;

the quantization parameter QP;

the block size and/or shape.

Besides the CABAC context modeling process is recursive, therefore according to a first variant of the second embodiment, the input data 910 to the NN 920 may further comprises:

Values of S previously (encoding order) coded syntax elements of the same type;

Values of T previously (encoding order) coded bin values of the same type;

Values of K previously (encoding order) probabilities pk (k=1, . . . K) of syntax elements of the same type.

In traditional CABAC, there are finite state of probability ($\sigma$=0 . . . 63) whose values are determined recursively by $p_\sigma = \alpha \cdot p_{\sigma-1}$ where $\alpha \cong \approx 0.95$.

The probability update is made with the last coded bin value, incrementing or decrementing $\sigma$ by one jump if the bin value is the most probable (MPS) or less probable (LPS) bin value respectively. Thus, according to an exemplary embodiment, one uses K (K being a positive integer value, for instance K=3) previous probabilities and/or T (T being a positive integer value, for instance T=2) previous coded bin values and/or S (S being a positive integer value, for instance S=3) previous syntax elements values of the same type to model the probability evolution.

Advantageously, in order to add more stability to the NN output (probability estimate), one can:

Estimate the increment/decrement direction and update the probability by this increment;

Or allows for more than one jump (if the estimated probability is more than one jump) but limit the jump to n jumps (ex: n=3).

Advantageously the NN determines the contexts models associated to a syntax element as well as the probabilities associated with the context based on the input data 910.

According to a second variant of the second embodiment, the NN is a Recurrent Neural Network (RNN) and some inputs (i.e. the values of S previously coded syntax elements of the same type; or the values of T previously coded bin values of the same type) are useless. For example, such a RNN can be an Elman network, Jordan network or it can be composed of Long short-term memory (LSTM) units (or blocks). Indeed, it can be difficult to train standard RNNs to solve problems that require learning long-term temporal dependencies. This is because the gradient of the loss function decays exponentially with time. Contrary to basic RNNs, LSTM networks use special units behaving as a 'memory cell' that can maintain information in memory for long periods of time. This is implemented with a set of gates controlling when information enters the memory, when it's output, and when it's forgotten, allowing them to learn longer-term dependencies.

Besides, a NN architecture equivalent to a Recurrent Neural Network may also be used. In this case, the values of the S previously coded syntax elements of the same type or the values of the T previously coded bin values of the same type are useless because such values can be re-injected inside the RNN where the output h(t) of an iteration t is re-used at iteration t+1. Any of the variants of NN described for the first embodiment is also compatible with the present embodiment.

Figure 10:
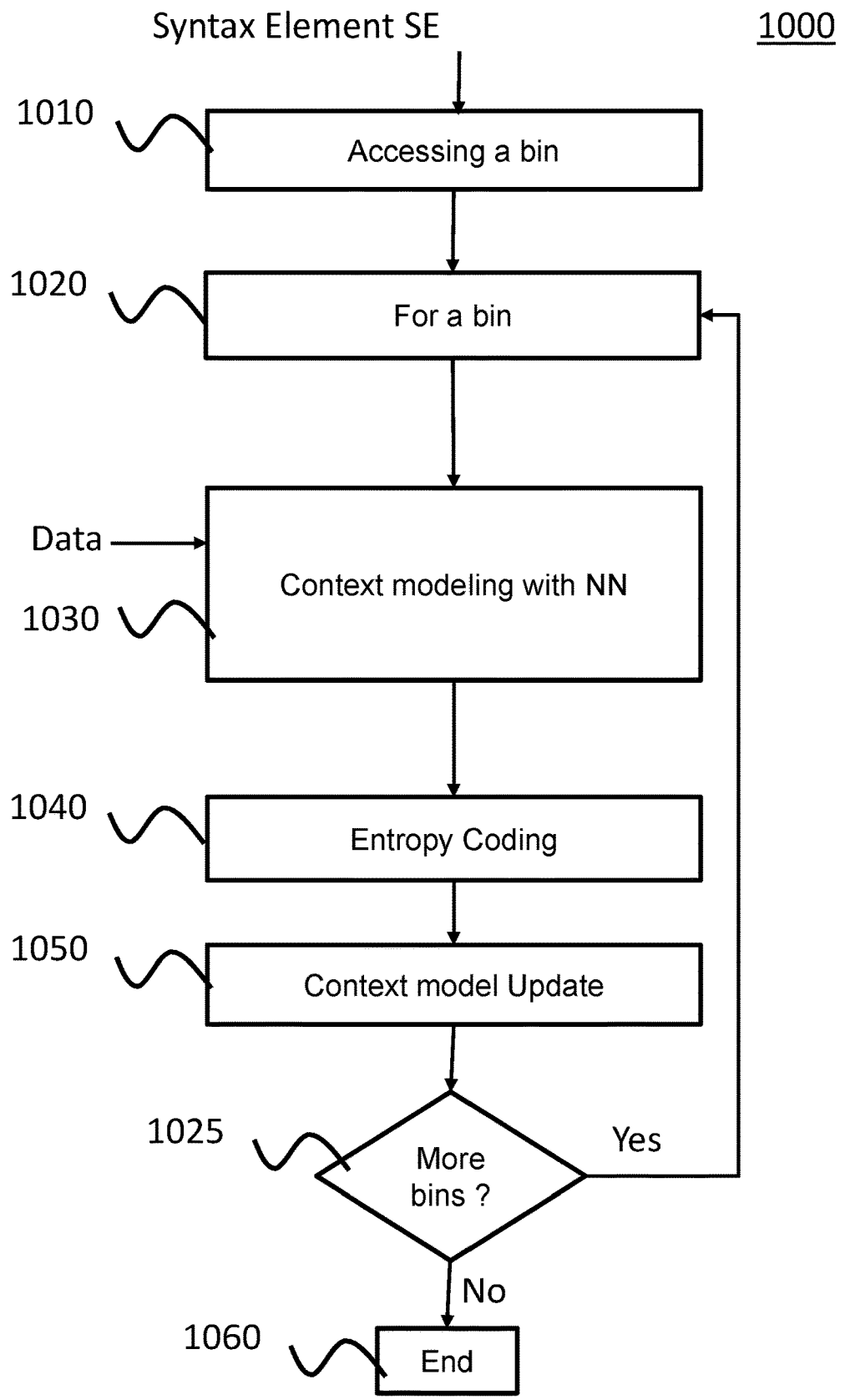
FIG. 10 illustrates a flowchart of an exemplary method of context-based entropy coding in accordance with a second embodiment of the present disclosure.

FIG. 10 illustrates a flowchart 1000 of an exemplary method of context-based entropy coding (e.g., CABAC) in accordance with an exemplary embodiment. FIG. 10 has similarities with FIG. 4. Steps 1010, 1020, 1040, 1025 and 1060 are similar to steps 410, 420, 440, 425 and 460, respectively. Steps 1030 and 1050 have differences from step 430 and 440, as explained below with the training. At step 1010, a binary value for the syntax element (SE) associated with a current block in a picture of a video is accessed, i.e. the syntax element (SE) 1010, when not already a binary value (such as a binary flag), is first binarized. Then, within loop 1020, for a bin:

a. At step 1030, a contextual probability is determined using contextual information of the syntax element to code by a NN. The contextual probability corresponds to the estimated conditional probability that the bin takes the value "b" knowing the context value CTX, i.e., P(b/CTX). The determination is based on contextual information, such as already-coded symbols (syntax elements) in the neighborhood of the current symbol (syntax element) to encode, the CU/PU/TU size or shape, the CU coding mode, or the slice type or other input data;

b. At step 1040, the bin is encoded using an entropy encoder (e.g., arithmetic encoder) according to the contextual probability P(b/CTX);

c. At step 1050, once the bin is coded, the context set is updated, i.e., the contextual probabilities are updated. For example, the update may represent a count update of the number of occurrences of the bin value ("0" or "1"). As previously detailed, one can estimate the increment/decrement direction and update the probability by this increment or allows for more than one jump increment/decrement (if the estimated probability is more then one jump) but limit the jump to n jumps (ex: n=3).

d. At step 1025, a check if there are more bins to encode is performed. If yes, return to step 1020 (e.g., by moving to the next bin of the syntax element); otherwise, end the process at step 1060.

Without loss of generality, steps 1040 and 1050 may be switched in order or be performed in parallel.

As previously detailed, various architectures are compatible with a NN with multi-components input for use in the present embodiment as well as multiple training scheme (online, offline). The training of the NN according to 2 variants of a second embodiment of the present principles is now described.

Figure 11:
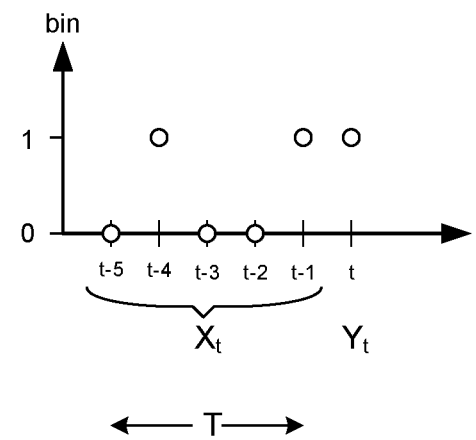
FIG. 11 illustrates a simplified block diagram of an exemplary training of the NN with one bin in a CABAC encoder in accordance with a second embodiment of the present disclosure.
Figure 11:
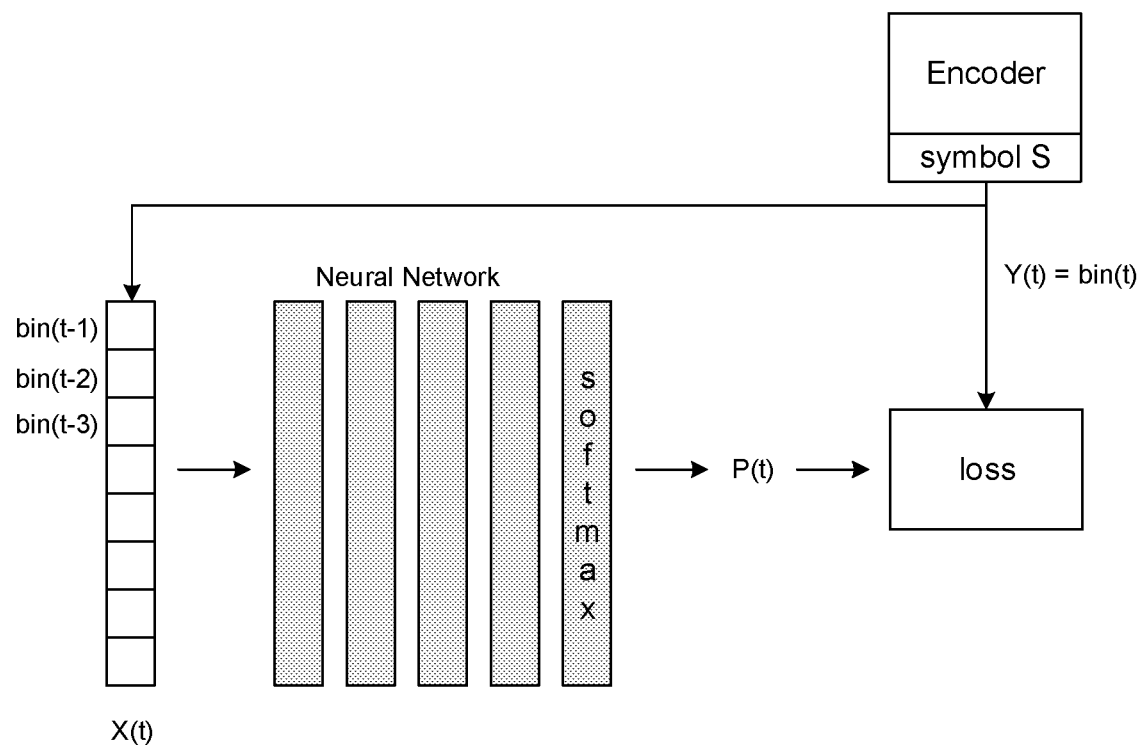

FIG. 11 illustrates a simplified block diagram of an exemplary training of the NN with one bin in a CABAC encoder in accordance with a second embodiment of the present disclosure. For a given bin symbol (i.e. syntax element SE) S, the training set is built from a regular encoder as illustrated with FIG. 4 by collecting the values (Xt,Yt) for each encoded bin symbols S, where Xt contains the T previously (encoding order) coded bin values of S and Yt is the current value of S. The loss (cross entropy cost) is computed as:

$$\text{Loss} = -(1-\text{bin}_t) \cdot \log(p_t) - \text{bin}_t \cdot \log(1-p_t) \quad (1)$$

Where $p_t$ is the output of the NN representing the estimated probability that the bin(t) is equal to zero, and bin(t) is the current bin value. Again, the skilled in the art will appreciate that the training of the one or more NN(s) for entropy coding does not deviate from usual framework for training a NN. This loss is then used to derive/tune new parameters of the NN through an optimization process. Once the NN is trained on a very large set of images and its parameters (weights) are set, the NN can be directly used by the encoder or sent to the decoder.

Figure 12:
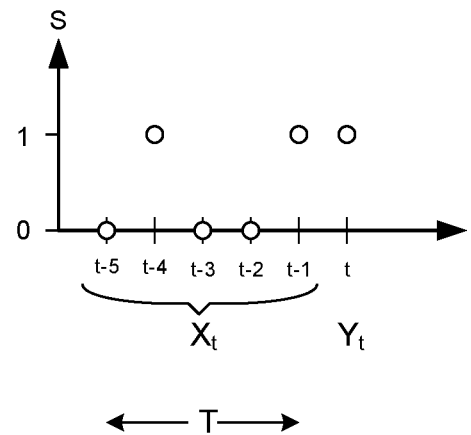
FIG. 12 illustrates a simplified block diagram of an exemplary training of the NN with one bin in a CABAC encoder in accordance with a second embodiment of the present disclosure.
Figure 12:
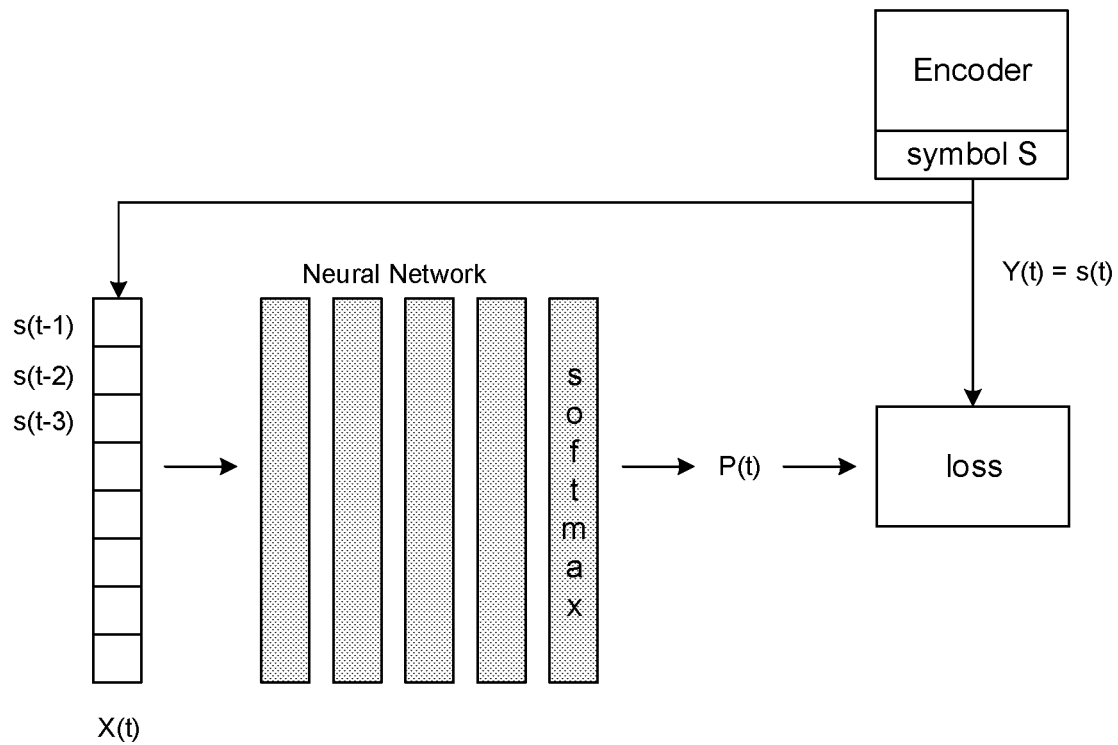

In a variant of the second embodiment, the symbol probability is processed as a whole by the NN, not each bin probability independently. FIG. 12 illustrates a simplified block diagram of an exemplary training of the NN with one symbol in a CABAC encoder in accordance with a second embodiment of the present disclosure. In this case, the NN is a classifier for all the possible values of S (the syntax element S may take N values or is an integer with limited range value). The output of the NN is $p_i(t)$ with $i=1 \ldots N$ and $p_i(t)$ is the probability that S is equal to the $i^{th}$ possible value. If the value of S at time t is the $s^{th}$ possible value, then the cross entropy cost function is:

$$\text{Loss} = \Sigma_{i=1, i \neq s}^{N} -p_i(t) \cdot \log(p_i(t)) \qquad (2)$$

In this case, the probability of each bin to be used by the Binary arithmetic coder 440 can be derived from the probability of the symbol considered as a whole.

In a variant, advantageously, one can use a modified version of the regular encoder for training, where the value of λ for RDO associated with the symbol S is forced to zero so that the regular coding model does not bias the results. The other symbols are coded with regular RDO and regular λ.

In one embodiment, the method may further include, at step 1040, providing the entropy encoded bin of the syntax element. The step of providing may include outputting or providing to another module of the encoder 100. The step of providing may be optional, bypassed or removed. Steps 1010 to 1040 may be performed, e.g., by encoder 100, in particular, by entropy coding block 145. The method 1000 may be performed for a plurality of bins of a syntax element, for a plurality of syntax elements (e.g., syntax elements associated with a plurality of transform coefficients in the block), and/or for a plurality of blocks in the picture. The method 1000 may be performed for a bin of a syntax element, for a syntax element in a block and/or for a block in the picture.

According to one embodiment of the method, the neural network is a recursive neural network.

According to one embodiment of the method, a plurality of neural network is used, a neural network being trained for a type of syntax element.

According to one embodiment of the method, the entropy encoding may be a CABAC entropy encoding.

According to one embodiment, the method may further include receiving the picture, partitioning the picture into a plurality of blocks including the block, determining a prediction residual for the block, transforming and quantizing the residual to obtain a plurality of transform coefficients and entropy encoding the residual. The steps of transforming and quantizing may be performed by, e.g., modules 125 and 130 of encoder 100. The step of entropy encoding may be performed by, e.g., module 145 of encoder 100. The steps of receiving, transforming and quantizing may be optional, bypassed or removed, since they may have been previously performed by another device and/or the results may have been stored in memory.

It is to be understood that any of the embodiments of the method 1000 described above may be implemented by encoder 100. The blocks of encoder 100 may be implemented by hardware (e.g., integrated circuits) or in software, stored in memory and executed by a processor.

Decoding

Figure 13:
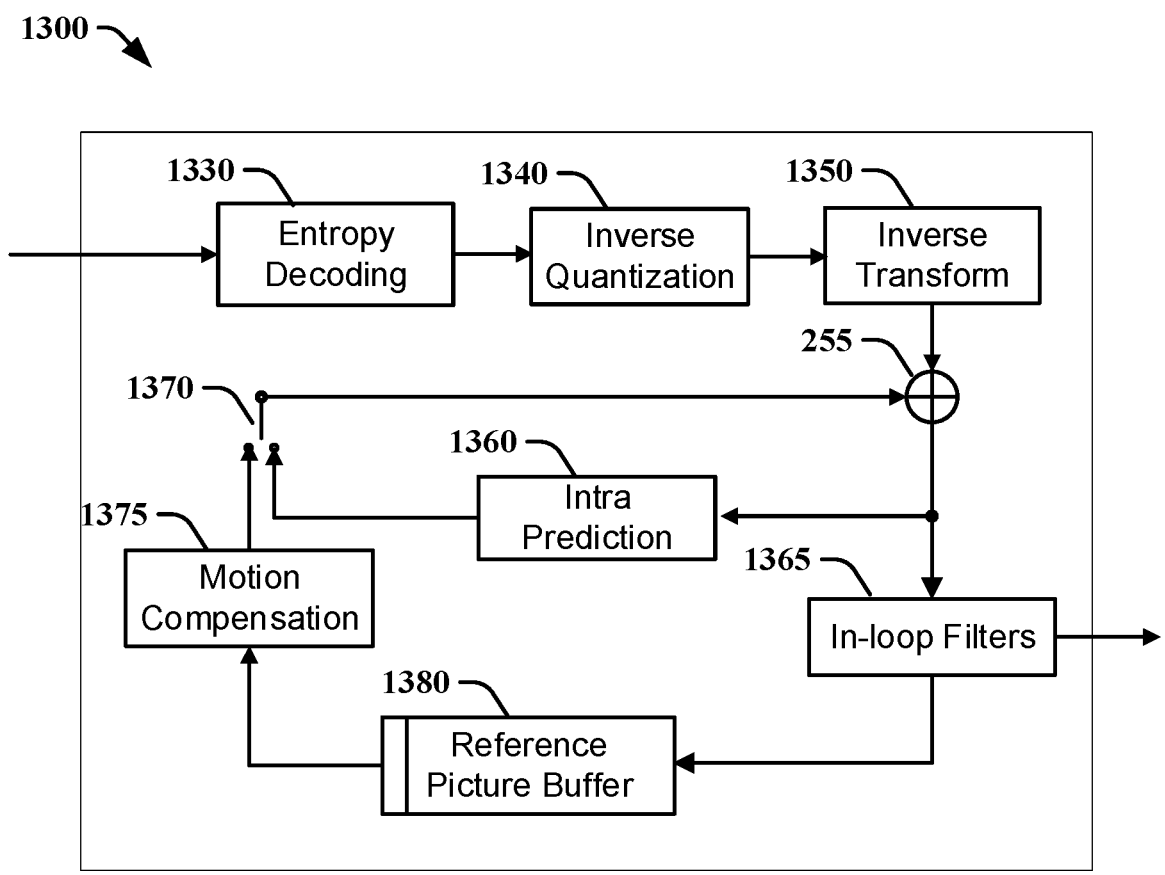
FIG. 13 illustrates a simplified block diagram of an exemplary video decoder in accordance with anyone of the embodiments of the present disclosure.

FIG. 13 illustrates a simplified block diagram of an exemplary video decoder 1300 in accordance with an embodiment of the present disclosure. The video decoder 1300 may be included in a receiver in a communication system. Video decoder 1300 generally performs a decoding pass reciprocal to the encoding pass performed by the video encoder 100 as described in FIG. 1. In particular, the input of the decoder 1300 includes a video bitstream, which may be generated by the video encoder 100. The bitstream is first entropy decoded (module 1330) to obtain transform coefficients, motion vectors, syntax elements and other coded information. The transform coefficients are de-quantized (module 1340) and inverse transformed (module 1350) to decode residuals. The decoded residuals are then combined (module 1355) with a predicted sample block (also known as a predictor) to obtain a decoded/reconstructed image block. The predicted sample block may be obtained (module 1370) from intra prediction (module 1360) or motion-compensated prediction (i.e., inter prediction) (module 1375). An in-loop filter (module 1365) may be applied to the reconstructed image. The in-loop filter may comprise a deblocking filter and a SAO filter. The filtered image is stored in a reference picture buffer 1380.

The modules of video decoder 1300 may be implemented in software and executed by a processor or may be implemented by well-known circuits by one skilled in the art of compression. In particular video encoder 1300 may be implemented as an integrated circuit (IC), alone or combined with video decoder 100 as a codec.

The modules of video decoder 1300 are also present in other video decoders (e.g., HEVC decoders), except for the differences described in the present disclosure, particularly, differences in the entropy decoding module 1330, as the reciprocal of module 145 of FIG. 1 according to the present disclosure, and as will be described in greater detail in the following paragraphs and figures. For functionalities other than entropy decoding (e.g., modules other than 1330), video decoder 1300 may be similar to an HEVC video decoder and the functionalities are not herein described in detail.

Entropy Decoding

As previously described, in the HEVC standard, quantized coefficients contained in a so-called transform-block (TB) may be entropy coded and decoded using CABAC. At the CABAC decoder the general reciprocal functions of the CABAC encoder are performed. CABAC and other context-based encoders and decoders are well-known by those skilled in the art of compression and are not herein described in detail. The present disclosure applies to general context-based entropy encoders and decoders (e.g., CABAC encoders and decoders) and relates to determining an improved prediction of the syntax element or improved context probabilities used for the entropy compression of elements (e.g., syntax elements) by a neural network.

The input to the process of CABAC decoding consists in the coded bitstream, typically conforming to the HEVC standard. At any point of the decoding process, the decoder knows which syntax element is to be decoded next since it is fully specified in the standardized bitstream syntax and decoding process. Moreover, it also knows how the current syntax element to be decoded is binarized (i.e., represented as a sequence of binary symbols called bins, each equal to '1' or '0'), and how each bin of the bin string has been encoded.

Therefore, the first stage of the CABAC decoding process decodes a series of bins. For a bin, it knows if it has been encoded according to the bypass mode or the regular mode. The bypass mode consists in simply reading a bit in the bitstream and assigning the obtained bit value to the current bin. This mode has the advantage of being straightforward, hence fast, and typically used for bins that have a uniform statistical distribution, i.e. equal probability of being equal to '1' or '0'.

If the current bin has not been coded in bypass mode, then it has been coded in the regular mode, i.e. through context-based arithmetic coding. In regular mode, first, a context is obtained for the decoding of a current bin. The context is given by a context modeler module associated with the regular mode. The goal of the context is to obtain the conditional probability that the current bin has value '0', given some contextual prior or information X. The prior X is the value of some already decoded syntax element, available both on the encoder and decoder side in a synchronous way, at the time current bin is being decoded.

Typically, the prior X used for the decoding of a bin is specified in the standard, and is chosen because it is statistically correlated with the current bin to decode. The use of this contextual information permits reducing the rate cost of coding the bin, since the conditional entropy of the bin given X decreases as the bin and X correlation increases, as it is well-known in information theory (H(bin|X)<H(bin), or the conditional entropy of bin knowing X is lower than the entropy of bin if bin and X are statistically correlated).

The contextual information X is thus used to obtain the probability of a current bin being '0' or '1'. Given these conditional probabilities, the regular decoding mode performs the arithmetic decoding of the binary value bin. The value of bin is then used to update the value of the conditional probabilities associated with current bin, knowing the current contextual information X. This is called the context model updating. Updating the context model for each bin as long as the bins are being decoded (or coded), allows progressively refining the context modeling for each binary element. Thus, the CABAC decoder progressively learns the statistical behavior of each regular encoded bin. The regular arithmetic decoding of current bin or its bypass decoding, depending on how it was coded, leads to a series of decoded bins.

It is to be understood that the context modeler and the context model updating steps are strictly identical operations on the CABAC encoder and on the decoder sides.

The second phase of the CABAC decoding, consists in converting this series of binary symbols into higher level syntax elements. A syntax element may take the form of a flag, in which case it directly takes the value of current decoded bins. On the other hand, if the binarization of current syntax element corresponds to a set of several bins according to a considered standard specification, a conversion step, called "Binary Codeword to Syntax Element" takes place. The conversion step is the reciprocal of the binarization step that was performed by the encoder. As an example, the standard binarization of the syntax elements results in the following encoded elements: last_sig_coeff_x_prefix, last_sig_coeff_y_prefix, last_sig_coeff_x_suffix, and last_sig_coeff_y_suffix. The inverse conversion performed by the decoder thus consists in obtaining the value of these syntax elements based on their respective decoded binarized versions.

Therefore, a decoder according to an embodiment of the present principles either implement a neural network using data decoded prior to the current syntax element for decoding the syntax element based on an improved prediction of the syntax element or for modeling and determining improved context probabilities of elements (e.g., syntax elements).

According to a first embodiment, while converting this series of binary symbols into higher level syntax elements, the CABAC implement a NN that determines for a syntax element, a prediction of the syntax element responsive to input data. Such NN is strictly equivalent to the NN 530 and input data 520 of the encoder 500 of FIG. 5. Then the decoded series of bins, coding the relevance of the prediction, is used with the prediction to determine the syntax element coded by the CABAC encoder. According to the variant, where the syntax element is a flag, a XOR between the prediction of the flag and the decoded bin results in the decoded syntax element. The description of the different variants of the first embodiment is skipped but will be easily understood for the skilled in the art for the decoder.

According to a second embodiment, decoding process decodes a series of bins, the CABAC implement a NN that determines a context associated with said syntax element, a probability associated with the syntax element using data decoded prior to the syntax element. Thus, the context model and probability update are performed by the NN.

Figure 14:
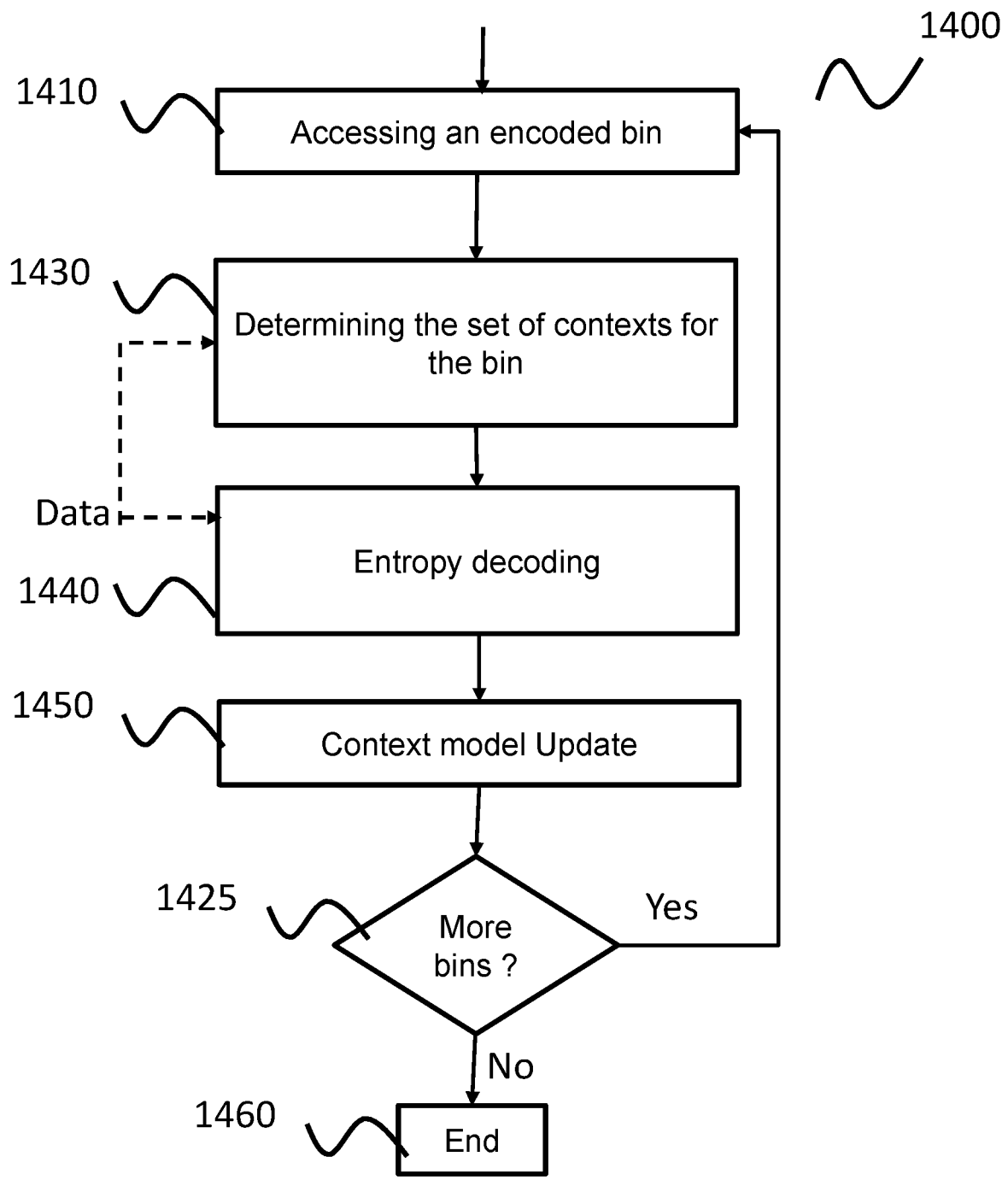
FIG. 14 illustrates a flowchart of an exemplary method of context-based entropy decoding in accordance with a first or second embodiment of the present disclosure.

FIG. 14 illustrates a flowchart 1400 of an exemplary method of context-based entropy decoding (e.g., CABAC) in accordance with any one of the embodiments of the present disclosure. FIG. 14 is the reciprocal of FIG. 6 or 10. The bitstream is received with encoded video, including entropy encoded syntax elements. Steps 1425, 1430, 1450 and 1460 are similar to steps 625, 630, 650 and 660, respectively (or are similar to steps 1025, 1030, 1050 and 1060, respectively) and will not be further explained. Steps 1440 is the reciprocal of step 640 (or 1040), in that it performs entropy decoding, instead of entropy encoding.

Without loss of generality, steps 1440 and 1450 may be switched in order or be performed in parallel.

It is to be understood that the thresholds or levels used to transition or switch from one context model to another in a set of context models may be included in the bitstream, encoded or not, and may be retrieved at the decoder in order to perform the method of FIG. 14.

In one embodiment, the method may further include, at step 1440, providing the entropy decoded bin of the syntax element. The step of providing may include outputting or providing to another module of the decoder. The step of providing may be optional, bypassed or removed.

Steps 1410 to 1440 may be performed, e.g., by decoder 1300, in particular by entropy decoding module 1330. The method 1400 may be performed for a plurality of bins of the syntax elements, for a plurality of syntax elements in the block and/or for a plurality of blocks in the picture. The method 1400 may be performed for a bin of the syntax element, for a syntax element in the block, and/or for a block in the picture.

According to one embodiment of the method, the entropy decoding may be a CABAC entropy decoding.

According to one embodiment, the method may further include receiving the encoded picture, entropy decoding the block, inverse transforming the block to obtain decoded residuals, combining the decoded residuals with a predicted sample block to obtain a decoded/reconstructed image block. The transform coefficients may be further inverse quantized prior to inverse transformed. The steps of entropy decoding, inverse transforming and inverse quantizing may be performed by, e.g., modules 1330, 1350 and 1340 of decoder 1300, respectively. The steps of receiving, entropy decoding, inverse transforming and inverse quantizing, and combining may be optional, bypassed or removed, since they may have been previously performed by another device and/or provided to another device, or the results may have been retrieved from and/or stored in memory.

It is to be understood that any of the embodiments of the method 1400 described above may be implemented by decoder 1300. The blocks of decoder 1300 may be implemented by hardware (e.g., integrated circuits) or in software, stored in memory and executed by a processor.

Figure 15:
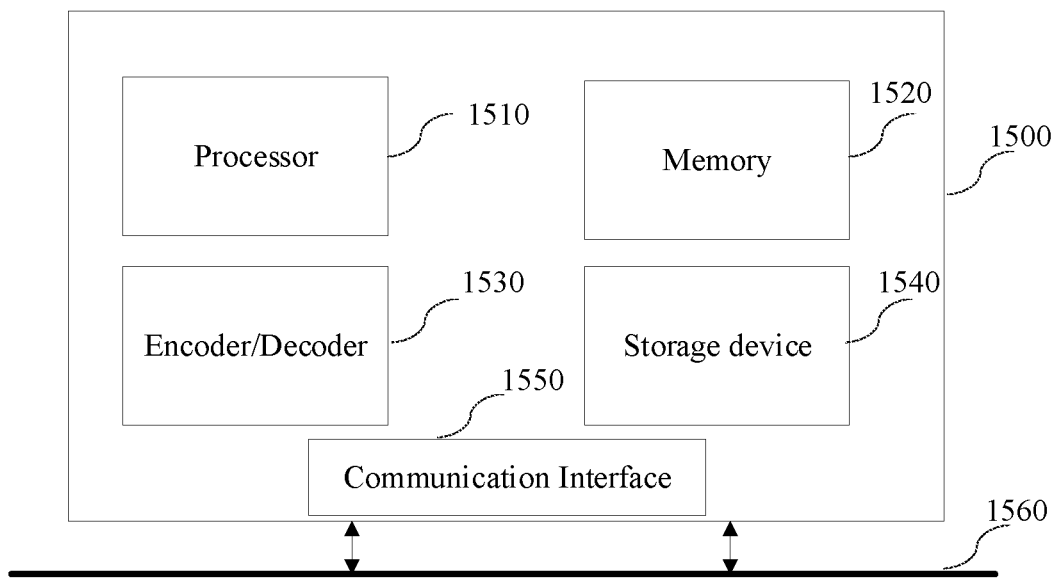
FIG. 15 illustrates a block diagram of a computing environment within which aspects of the present disclosure can be implemented and executed.

FIG. 15 illustrates a block diagram 1500 of an exemplary system in which various aspects of the exemplary embodiments of the present disclosure may be implemented. System 1500 may be embodied as a device including the various components described below and is configured to perform the processes described above. Examples of such devices, include, but are not limited to, personal computers, laptop computers, smartphones, smart watches, tablet computers, digital multimedia set top boxes, digital television receivers, personal video recording systems, connected home appliances, and servers. System 1500 may be communicatively coupled to other similar systems, and to a display via a communication channel as shown in FIG. 15 and as known by those skilled in the art to implement the exemplary video system described above. System 1500 may implement encoder 100, decoder 1300 or both, independently or jointly. Moreover, system 1500 may implement and be configured to execute any of the processes of the present disclosure, including method 600, 1000 and/or 1400, independently or jointly.

The system 1500 may include at least one processor 1510 configured to execute instructions loaded therein for implementing the various processes as discussed above. Processor 1510 may include embedded memory, input output interface and various other circuitries as known in the art. The system 1500 may also include at least one memory 1520 (e.g., a volatile memory device such as RAM, a non-volatile memory device such as ROM).

System 1500 may additionally include a storage device 1540, which may include non-volatile memory, including, but not limited to, an erasable programmable read-only memory (EPROM), ROM, a programmable read-only memory (PROM), a dynamic RAM (DRAM), a static RAM (SRAM), flash memory, magnetic disk drive, and/or optical disk drive. The storage device 1540 may comprise an internal storage device, an attached storage device and/or a network accessible storage device, as non-limiting examples. System 1500 may also include an encoder/decoder module 1530 configured to process data to provide an encoded video or decoded video.

Encoder/decoder module 1530 represents the module(s) that may be included in a device to perform the encoding and/or decoding functions, for example, according to FIGS. 6, 10 and 14, respectively. As is known in the art of compression, a device may include one or both of the encoding and decoding modules. Additionally, encoder/decoder module 1530 may be implemented as a separate element of system 1500 or may be incorporated within processors 1510 as a combination of hardware and software as known to those skilled in the art. For example, encoder/decoder module 1530 may be implemented as one or two separate integrated circuits and/or field-programmable gate array (FPGA).

Program code to be loaded onto processors 1510 to perform the various processes described hereinabove may be stored in storage device 1540 and subsequently loaded onto memory 1520 for execution by processors 1510. In accordance with the exemplary embodiments of the present disclosure, one or more of the processor(s) 1510, memory 1520, storage device 1540 and encoder/decoder module 1530 may store one or more of the various items during the performance of the processes discussed herein above, including, but not limited to the input video, the decode video, the bitstream, equations, formula, matrices, variables, operations, and operational logic.

The system 1500 may also include communication interface 1550 that enables communication with other devices via communication channel 1560. The communication interface 1550 may include, but is not limited to a transceiver configured to transmit and receive data from communication channel 1560. The communication interface may include, but is not limited to, a modem or network card and the communication channel may be implemented within a wired and/or wireless medium. The various components of system 1500 may be connected or communicatively coupled together using various suitable connections, including, but not limited to internal buses, wires, and printed circuit boards.

The exemplary embodiments according to the present disclosure may be carried out by computer software executed by the processor 1510 or by hardware, or by a combination of hardware and software. As a non-limiting example, the exemplary embodiments according to the present disclosure may be implemented by one or more integrated circuits. The memory 1520 may be of any type appropriate to the technical environment and may be implemented using any appropriate data storage technology, such as optical memory devices, magnetic memory devices, semiconductor-based memory devices, fixed memory and removable memory, as non-limiting examples. The processor 1510 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

According to an aspect of the present disclosure, an apparatus 1500 for video encoding is provided, the apparatus including a processor 1510, and at least one memory 1520, 1540 coupled to the processor, the processor 1510 being configured to perform any of the embodiments of the method of video encoding 600 or 1000 described above.

According to an aspect of the present disclosure, an apparatus 1500 for video decoding is provided, the apparatus including a processor 1510, and at least one memory 1520, 1540 coupled to the processor, the processor 1510 being configured to perform any of the embodiments of the method of video decoding 1300 described above.

According to an aspect of the present disclosure, an apparatus for video encoding is provided including means for accessing a bin of a syntax element associated with a block in a picture of a video, means for determining a context for the bin of the syntax element and means for entropy encoding the bin of the syntax element based on the determined context wherein the means for accessing a bin or the means for determining a context are implemented according to any of the disclosed embodiment. The video encoders of FIGS. 1 and 15 may include the structure or means of the apparatus, particularly, blocks 145, 1510 and 1530.

According to an aspect of the present disclosure, an apparatus for video decoding is provided including means for accessing an encoded bin of a syntax element associated with a block in a picture of an encoded video, means for determining a context for the bin of the syntax element with a syntax element and means for entropy decoding the encoded bin of syntax element based on the determined context. FIGS. 13 and 15 may include the structure or means of the apparatus for video decoding, particularly, blocks 1330, 1510 and 1530.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to an aspect of the present disclosure, a signal including a bitstream formatted to include encoded data representative of a block of a picture, the encoded data encoded according to any of the embodiments of the methods 600 or 1000 of video encoding.

According to an aspect of the present disclosure, a bitstream formatted to include encoded data representative of a block of a picture, the encoded data encoded according to any of the embodiments of the methods 600 or 1000 of video encoding.

Moreover, any of the methods 600, 1000 and/or 1400 may be implemented as a computer program product (independently or jointly) comprising computer executable instructions which may be executed by a processor. The computer program product having the computer-executable instructions may be stored in the respective transitory or non-transitory computer-readable storage media of the system 1500, encoder 100 and/or decoder 1300.

According to an aspect of the present disclosure, a computer-readable program product is provided including program code instructions for performing any of the embodiments of any of the methods 600, 1000, and/or 1400 (independently or jointly) of the present disclosure.

It is important to note that one or more of the elements in the processes 600, 1000 and/or 1400 may be combined, performed in a different order, or excluded in some embodiments while still implementing the aspects of the present disclosure. Other steps may be performed in parallel, where the processor does not wait for a full completion of a step before starting another.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a ROM, EPROM, Flash memory, a portable compact disc read-only memory (CD-ROM), an optical storage device, a magnetic storage device, or any suitable combination of the foregoing.

According to an aspect of the present disclosure, a computer-readable storage medium carrying a software program is provided including program code instructions for performing any of the embodiments of any of the methods of the present disclosure, including methods 600, 1000 and/or 1400.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment.

Additionally, the present disclosure or its claims may refer to "determining" various pieces of information. Determining the information may include one or more of, for example, estimating the information, calculating the information, predicting the information, selecting the information or retrieving the information from memory.

Also, the present disclosure or its claims may refer to "providing" various pieces of information. Providing the information may include one or more of, for example, outputting the information, storing the information, transmitting the information, sending the information, displaying the information, showing the information, processing the information, or moving the information.

Moreover, the present disclosure or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information.

Further, the present disclosure or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the processes of present disclosure are programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method of video encoding comprising:
accessing a bin of a syntax element associated with a current block in a picture of a video;
determining a context for the bin of the syntax element, said context being associated with said syntax element; and
entropy encoding the bin of the syntax element based on the determined context;
wherein said accessing a bin of a syntax element comprises:
determining, for the syntax element, a prediction of the syntax element by applying a neural network on data encoded prior to said syntax element, said data encoded prior to said syntax element comprising spatial and temporal information relative to a block previously encoded or to the current block, wherein the prediction of the syntax element output from the neural network is a vector giving the probabilities for each of the possible value of syntax element; and
determining a bin of the syntax element based on a value representative of the difference between the prediction and the syntax element, wherein the value representative of the difference between the prediction and the syntax element is a codeword for each of the syntax element values based on the associated probability using a Huffman coding.

2. The method according to claim 1, wherein said data encoded prior to said syntax element comprises at least one among:

the values of a previously encoded syntax elements of the same type in a neighborhood of the current block;
the reconstructed samples in the L-shape of the current block;
the prediction samples of the current block;
the reconstructed residuals of the current block;
the samples in the L-shape of a reference block for the current block when the current block is coded in inter;
the motion field for the current block when the current block is coded in inter;
the prediction samples of the current block generated with motion compensation using said motion field;
the quantization parameter; or
the current block size.

3. A method of video decoding comprising:
accessing an encoded bin of a syntax element associated with a current block in a picture of an encoded video;
determining a context for the bin of the syntax element associated with said syntax element; and
entropy decoding the encoded bin of the syntax element based on the determined context;
wherein said entropy decoding comprises:
determining, for the syntax element, a prediction of the syntax element by applying a neural network on data decoded prior to said syntax element, said data decoded prior to said syntax element comprising spatial and temporal information relative to a block previously decoded or to the current block, wherein the prediction of the syntax element output from the neural network is a vector giving the probabilities for each of the possible value of syntax element; and
determining the syntax element based on the determined prediction of the syntax element and the decoded bin of the syntax element, the decoded bin of the syntax element being a value representative of the difference between the prediction and the syntax element, wherein the value representative of the difference between the prediction and the syntax element is a codeword for each of the syntax element values based on the associated probability using a Huffman coding.

4. The method according to claim 3, wherein said data decoded prior to said syntax element comprises at least one among:

the values of a previously decoded syntax elements of the same type in a neighborhood of the current block;
the reconstructed samples in the L-shape of the current block;
the prediction samples of the current block;
the reconstructed residuals of the current block;
the samples in the L-shape of a reference block for the current block when the current block is coded in inter;
the motion field for the current block when the current block is coded in inter;
the prediction samples of the current block generated with motion compensation using said motion field;
the quantization parameter; or
the current block size.

5. An apparatus for video encoding comprising a memory and one or more processors configured to:
access a bin of a syntax element associated with a current block in a picture of a video;
determine a context for the bin of the syntax element associated with said syntax element; and
entropy encode the bin of the syntax element based on the determined context;

wherein said one or more processors are further configured to:
determine by a neural network, for the syntax element, a prediction of the syntax element responsive to data encoded prior to said syntax element, said data encoded prior to said syntax element comprising spatial and temporal information relative to a block previously encoded or to the current block, wherein the prediction of the syntax element output from the neural network is a vector giving the probabilities for each of the possible value of syntax element; and
determine a bin of the syntax element based on a value representative of the difference between the prediction and the syntax element, wherein the value representative of the difference between the prediction and the syntax element is a codeword for each of the syntax element values based on the associated probability using a Huffman coding.

6. The apparatus according to claim 5, wherein said data encoded prior to said syntax element comprises at least one among:
the values of a previously encoded syntax elements of the same type in a neighborhood of the current block;
the reconstructed samples in the L-shape of the current block;
the prediction samples of the current block;
the reconstructed residuals of the current block;
the samples in the L-shape of a reference block for the current block when the current block is coded in inter;
the motion field for the current block when the current block is coded in inter;
the prediction samples of the current block generated with motion compensation using said motion field;
the quantization parameter; or
the current block size.

7. An apparatus for video decoding comprising a memory and one or more processors configured to:
access an encoded bin of a syntax element associated with a current block in a picture of an encoded video;
determine a context for the bin of the syntax element associated with said syntax element; and
entropy decode the encoded bin of syntax element based on the determined context;
wherein said one or more processors are further configured to:
determine, by a neural network, for the syntax element, a prediction of the syntax element responsive to data decoded prior to said syntax element, said data decoded prior to said syntax element comprising spatial and temporal information relative to a block previously decoded or to the current block, wherein the prediction of the syntax element output from the neural network is a vector giving the probabilities for each of the possible value of syntax element;
determine the syntax element responsive to the determined prediction of the syntax element and the decoded bin of the syntax element, the decoded bin of the syntax element being a value representative of the difference between the prediction and the syntax element, wherein the value representative of the difference between the prediction and the syntax element is a codeword for each of the syntax element values based on the associated probability using a Huffman coding.

8. The device according to claim 7, wherein said data decoded prior to said syntax element comprises at least one among:
the values of a previously decoded syntax elements of the same type in a neighborhood of the current block;
the reconstructed samples in the L-shape of the current block;
the prediction samples of the current block;
the reconstructed residuals of the current block;
the samples in the L-shape of a reference block for the current block when the current block is coded in inter;
the motion field for the current block when the current block is coded in inter;
the prediction samples of the current block generated with motion compensation using said motion field;
the quantization parameter; or
the current block size.

9. A non-transitory program storage device, readable by a computer, tangibly embodying a program of instructions executable by the computer for performing the method according to claim 1.

10. A non-transitory program storage device, readable by a computer, tangibly embodying a program of instructions executable by the computer for performing the method according to claim 3.

11. A non-transitory program storage device having encoded data representative of a block in a picture of a video, the encoded data being generated according to claim 1.

12. A method of video decoding comprising:
accessing an encoded bin of a syntax element associated with a current block in a picture of an encoded video;
determining a context for the bin of the syntax element associated with said syntax element; and
entropy decoding the encoded bin of the syntax element based on the determined context;
wherein said entropy decoding comprises:
determining, for the syntax element, a prediction of the syntax element by applying a neural network on data decoded prior to said syntax element, said data decoded prior to said syntax element comprising spatial and temporal information relative to a block previously decoded or to the current block; and
determining the syntax element based on the determined prediction of the syntax element and the decoded bin of the syntax element, the decoded bin of the syntax element being a value representative of the difference between the prediction and the syntax element, wherein the syntax element is a flag, and the value representative of the difference between the prediction and the syntax element is a XOR value between the prediction and the flag.

13. An apparatus for video decoding, comprising:
a memory; and
one or more processors configured to:
access an encoded bin of a syntax element associated with a current block in a picture of an encoded video;
determine a context for the bin of the syntax element associated with said syntax element; and
entropy decode the encoded bin of syntax element based on the determined context;
wherein said one or more processors are further configured to:
determine, by a neural network, for the syntax element, a prediction of the syntax element responsive to data decoded prior to said syntax element, said data decoded prior to said syntax element comprising spatial and temporal information relative to a block previously decoded or to the current block;

determine the syntax element responsive to the determined prediction of the syntax element and the decoded bin of the syntax element, the decoded bin of the syntax element being a value representative of the difference between the prediction and the syntax element, wherein the syntax element is a flag, and the value representative of the difference between the prediction and the syntax element is a XOR value between the prediction and the flag.

* * * * *